United States Patent
Ueyanagi

(10) Patent No.: US 6,614,742 B2
(45) Date of Patent: Sep. 2, 2003

(54) OPTICAL HEAD, MAGNETO-OPTICAL HEAD, DISK APPARATUS AND MANUFACTURING METHOD OF OPTICAL HEAD

(75) Inventor: Kiichi Ueyanagi, Nakai-machi (JP)

(73) Assignee: Fuji Xerox, Ltd., Tokyo (JP)

( * ) Notice: Subject to any disclaimer, the term of this patent is extended or adjusted under 35 U.S.C. 154(b) by 413 days.

(21) Appl. No.: 09/735,540

(22) Filed: Dec. 14, 2000

(65) Prior Publication Data

US 2001/0004348 A1 Jun. 21, 2001

(30) Foreign Application Priority Data

Dec. 14, 1999 (JP) ............................................. 11-354719

(51) Int. Cl.[7] ................................................. G11B 7/00
(52) U.S. Cl. ..................................... 369/118; 369/44.24
(58) Field of Search ............................. 369/118, 44.23, 369/44.24, 13.33, 112.13, 112.23

(56) References Cited

U.S. PATENT DOCUMENTS

| 5,883,872 A | 3/1999 | Kino |
| 6,072,763 A | * 6/2000 | Takahashi ................... 369/118 |

FOREIGN PATENT DOCUMENTS

| JP | A 11-176007 | 7/1999 |
| JP | A 11-250460 | 9/1999 |

OTHER PUBLICATIONS

Silva et al., "Scanning near-field optical microscope for the imaging of magnetic domains in optically opaque materials" Appl. Phys. Lett. 65 (6), 1994, pp. 658–660.

Goto et al., "Present Status & Future Prospect for Optical Memory Using Near Field Optics" The 73rd Micro–optics joint study group material, pp. 27–33.

Onoue et al., "Optical disk technology" Radio Technology Co., Ltd., 1989, p. 95.

Matsumoto et al., "An Efficient Probe with a Planar Metallic Pattern for High–Density Near–Field Optical Memory" Dig. Of the 6th Int. Conf. On Near–Field Optics and Related Tech. 2000, No. MoO13 (2000).

Grober et al., "Optical antenna: Towards a unity efficiency near–field optical probe" Appl. Phys. Lett. 70(11), 1997, pp.1354–1356.

* cited by examiner

Primary Examiner—Nabil Hindi
(74) Attorney, Agent, or Firm—Oliff & Berridge, PLC

(57) ABSTRACT

The present invention relates to an optical head, a magneto-optical head, and a disk apparatus, that have high light efficiency, can realize high-density recording medium and perform high-speed recording and reproduction, and can prevent erroneous record or erroneous reproduction, and a manufacturing method of the optical head. When a converged beam enters an incident surface of a transparent condensing medium, its refracted beam is condensed on a light-condensed surface and forms a light spot. Since leaking out to an aperture formed on an outer surface of the light-condensed surface of this light spot, near field light is scattered by a micro metal member. In addition, since, also in the micro metal member, plasmon resonance occurs by the irradiation of a laser beam, near field light leaks out therefrom. This near field light becomes propagation light and enters a recording medium of a disk, and recording into the recording medium is performed by this light.

23 Claims, 20 Drawing Sheets

OPTICAL HEAD, MAGNETO-OPTICAL HEAD, DISK APPARATUS AND MANUFACTURING METHOD OF OPTICAL HEAD

BACKGROUND OF THE INVENTION

1. Field of the Invention

The present invention relates to an optical head, a magneto-optical head, a disk apparatus, and a manufacturing method of the optical head, and in particular, relate to an optical head, a magneto-optical head, and a disk apparatus, that have high light efficiency, can realize a high-density recording medium and perform high-speed recording and reproduction, and can prevent erroneous record or erroneous reproduction, and a manufacturing method of the optical head.

2. Discussion of the Related Art

Recently, in order to perform high-density recording on a magneto-optical disk or a magnetic disk which records data with light and a magnetic field, and an optical disk which records data only with light, minimization of near field light spot used for recording or reproduction has been investigated.

As conventional disk apparatuses using this miniaturized near field light, there are what are shown in, U.S. Pat. No. 5,883,872, Japanese Patent Laid-Open No. 11-176007 (1999), and a reference "Applied Physics Letters, vol. 65(6), p. 658(1994)".

FIG. 20 shows a disk apparatus shown in the above-described U.S. Pat. No. 5,883,872, and Japanese Patent Laid-Open No. 11-176007. This disk apparatus 1 has a laser source 2 emitting a laser beam, an objective lens 5 converging the laser beam emitted from the laser source 2, a solid immersion lens (SIL) 6 condensing the converged beam from the objective lens 5 and forming a light spot 9 on a light-condensed surface 6b of a bottom surface, a shade 7 that is provided on the light-condensed surface 6b of the SIL 6 and has a micro aperture 7a with the size smaller than that of the light spot 9, a beam splitter 13 separating the reflected light, derived from light emitted to a disk 12 through the micro aperture 7a, from emitted light from the laser source 2, and a photo detector 15 detecting the reflected light separated by the beam splitter 13. This aperture 7a is formed by coating the shade 7 on an entire surface of the light-condensed surface 6b of the SIL 6 and thereafter milling the shade 7 by using a focused ion beam method.

In the disk apparatus 1 configured in this manner, a laser beam emitted from the laser source 2 is converged by the objective lens 5 to be condensed on the light-condensed surface 6b of the SIL 6. Since the size of this aperture 7a is sufficiently smaller than that of the light spot 9, propagation light does not pass through this aperture 7a, and hence only near field light 10 leaks out on a surface of the aperture 7a of the light-condensed surface 6b. When a recording layer of the disk 12 is brought close to this near field light 10, this near field light 10 propagates into the recording layer, then recording and reproduction of information is performed. Since the size of the near field light 10 is determined with the size of the aperture 7a, minute recording and reproduction light that is a fraction of one or smaller than the size by only the SIL 6 can be obtained. Therefore, it is possible to increase recording density by using this for recording.

FIG. 21 shows a near field light microscope disclosed in the above-described reference. This near field light microscope 80 uses the near field light, whose light intensity is increased by plasmon resonance, for observation of a minute substance. This microscope 80 has an argon ion laser 83 emitting a blue laser beam 83a in an oblique direction, a hemispherical lens (SIL) 81 condensing the blue laser beam 83a, emitted from the argon ion laser 83, in a central part of a light-condensed surface 81a of a bottom surface, a micro metal particle 82 made of Ag with the diameter of 30 nm that is coated on the central part of a flat surface 81b of the hemispherical lens 81, and a photo multiplier (PM) 89 detecting reflected light 87 from an optical disk 125 through an objective lens 88. In the near field light microscope 80 configured in this manner, the blue laser beam 83a is made to enter a hemispherical incident surface 81a of the hemispherical lens 81 from an oblique angle so that the blue laser beam 83a emitted from the argon ion laser 83 is totally reflected on the flat surface 81b of the hemispherical lens 81. Furthermore, the blue laser beam 83a is condensed at and emitted to a position of a micro metal particle 82. Then, the plasmon resonance is generated in the micro metal ball 82, and near field light 84 generated therefrom is made to enter a recording film 86 of the optical disk 125. Moreover, reflected light 87 from the recording film 86 is condensed on the PM 89 by the objective lens 88 on the hemispherical lens 80 and is detect. In addition, the optical disk 125 is scanned in the X-Y direction with a piezo element, and recording marks in the recording film 86 are displayed by inputting an output signal of the PM 89 into a luminance signal of a monitor TV (not shown) in performing synchronization with the scanning. Although being a near field light microscope, this device can also be used for optical recording. Since it is possible to obtain the near field light 84 with the minute size, which is a fraction of the size in the case of only the hemispherical lens 81; it is possible to increase recording density by using this for recording.

FIG. 22 shows a metal structure described in the Dig. of the 6th Int. Conf. on Near-Field Optics and Related Tech. 2000, No. MoOI3 (2000). As shown in FIG. 22, the metal structure consists of small metal bodies 91a and 91a' faced each other with a small gap 91c between them. The width of apexes 91b and 91b' of the metal bodies and the gap 91c are about 20 nm and far less than the wavelength of incident laser beam 92.

By arranging the polarization direction of the incident laser beam 92 to cross over the gap, a surface plasmon is excited in the metal bodies 92a and 92a' and vibrated in the direction parallel to the polarization direction, and electric charges having opposite polarities with each other in the apexes 92b and 92b' causes dipole and the dipole generates the plasmon effectively. The induced electric charges which constitute an electric dipole, generate a strong near-field light 93 effectively, the size of which is nearly equal to that of the gap 92c.

The simulation result shows that the dipole excited emits a near-field light which intensity is 2300 times larger than that of the incident light and is emitted only around the gap 91c. An experimental result about micro wave radiation with a dipole antenna (R. D. Grober et al.: Appl. Phys. Lett, Vol.70, No.11, (1997) p.1354) shows that the radiation occurs only around the gap region. The reason is that the antenna acts as a shield for the incident microwave because the conductivity of the metal antenna is so high enough to induce a strong dipole and the dipole has a strong shield effect.

But in the case of the optical frequency region (FIG. 22), the most of the incident wave passes side of the metal shade without coupling to the metal shade and is emitted out from the bottom surface of the transparent condensing medium, because the conductivity of the metal shade is not high enough to shield the incident wave, and the spot size of the incident is fairly larger than the size of the metal shade and its gap. The passed beam 92b irradiates and affects a recording medium when the medium is placed just under the metal bodies 92a and 92a for applying the near-field light for recording, which prevents the near-field light to make small recorded marks even if the size of the near-field light could be small enough.

According to a conventional disk apparatus shown in FIG. 20, light contributing to recording and reproduction is only the near field light 10 leaking out from the micro aperture 7a, and most of a laser beam condensed on the light-condensed surface 6b is reflected. In order that the shade 7 sufficiently shields a laser bear, usually, the thickness of more than several ten nm is necessary. Since the leak-out length of the near field light is generally in the same order to the size of an aperture, the diameter and depth of the aperture 7a becomes nearly equal if the diameter of the aperture 7a is stopped down at nearly 50 nm. Because of these reasons, the conventional disk apparatus has problems that the near field light entering a recording layer is significantly reduced in comparison with the laser beam condensed on the light-condensed surface 6b even if the recording layer of the disk 12 is brought close to the aperture 7a, and light efficiency is low, and hence it is not possible to increase transfer rates of recording and reproduction. In particular, at the time of reproduction, it is necessary to make the reflected light from the disk 12 enter the photo detector 15 through the micro aperture 7a. Nevertheless, since diffusing isotropically, the reflected light has a large flare angle, and hence a returning rate to this micro aperture 7a is low. In addition, if the intensity of the laser beam is increased, the laser beam absorbed by the shade 7 increases, and hence the shade 7 is heated and may be melted. Therefore, there is a problem that, consequently, it is not possible to achieve high-density and high-speed recording and reproduction.

In addition, if the conventional near field light microscope shown in FIG. 21 is used for recording of an optical disk, there are the following problems. In the conventional near field light microscope, the laser beam 83a is entered into the hemispherical lens 81 from an oblique angle since it is necessary to make the laser beam 83a be totally reflected on the light-condensed surface 81b so as to generate the plasmon resonance. Primarily, the diameter of the spot obtained is 10 μm, and hence this is 3000 times or more as large as 30 nm of diameter of the micro metal member 82. Since only the partial light of this light spot that illuminates the micro metal member 82 contributes to the plasmon resonance, the light efficiency is extremely low. Therefore, there is another problem that a large photomutiplier is required for detecting reproduced light. In addition, since the near field light leaks out from a position of the light spot of the light-condensed surface 81b, this light becomes far stronger than the near field light generated from plasmon excited in the micro metal member 82. Therefore, there is still another problem that erroneous record or reproduction is performed by this light.

In addition, Goto et al. (The 73rd Micro-optics joint study group material, pp. 27–33) proposes a recording head having an ultra micro aperture, having a direct tapered-light guide part and an ultra micro coaxial tapered-wave guide in its end, in an end of output part of a surface emitting laser. Nevertheless, this is configured so that a beam is stopped down by making only a component which is totally reflected on a tapered surface before a coaxial part reaches the center of the coaxial part and making other components be cut. Therefore, as for light distribution of the beam reached, not only the distribution of light in a central part itself is few, but also the quantity of the light around the center is further weaker, the diameter of the beam inevitably becomes small. Therefore, when the beam enters the coaxial part, most of the beam is vignetted in the end of a central conductor, and hence only the residual weak light leaks out from its vicinity, and this is used as propagation light. Therefore, it is inferred that it is difficult to increase the transfer rates.

SUMMARY OF THE INVENTION

Therefore, the present invention provides an optical head, a magneto-optical head, and a disk apparatus, that have high optical efficiency, can realize a high-density recording medium and perform high-speed recording and reproduction, and can prevent erroneous record or erroneous reproduction, and a manufacturing method of the optical head.

According to the present invention, an optical head includes a transparent condensing medium which has a condensed surface to condense the laser beam to form a beam spot on the condensed surface, a shade provided on the transparent condensing medium and having an aperture, and a micro metal member at least part of which is positioned in the aperture. The aperture is positioned at which the beam spot is formed and the area of the aperture is smaller than the size of the beam spot.

According to the above configuration, by condensing light from a medium side of the transparent condensing medium, a light-condensing spot is minimized in inverse proportion to a refractive index of the transparent condensing medium. Therefore, it is possible to obtain a light spot that is highly efficient and minute in comparison with light condensed in the atmosphere. By illuminating the aperture, which has the micro metal member inside of the aperture, with the condensed laser beam, it becomes possible to perform recording and reproduction with high light efficiency.

Thus, the present invention uses scattering of a near field light that is formed on a light-condensed surface of a transparent condensing medium. The scattering is caused by the micro metal member, and the near field light that is strengthened by surface plasmon excitation in the micro metal member. By locating the near field light obtained by this surface plasmon excitation close to a recording medium, the near field light enters the recording medium to become propagation light, and makes it possible to perform recording and reproduction with high light efficiency. In addition, since the breadth of this near field light is nearly the size of the micro metal member, it becomes also possible to miniaturize the size of a recording mark by miniaturizing the micro metal member, so it becomes possible to perform high-density recording. Furthermore, in the present invention, a partial laser beam that is condensed outside the aperture does not enter the recording medium since being cut off by the shade, so it is possible to prevent erroneous record or erroneous reproduction. Moreover, at the time of reproduction, since the reflected light from the disk is made to enter through the comparatively large doughnut-shaped aperture surrounding the micro metal member in the central part, it becomes also possible to efficiently bring in the reflected light.

Another aspect of the present invention provides an optical head including a transparent condensing medium which has a condensed surface and condenses the laser beam to form a beam spot on the condensed surface, a shade provided on the transparent condensing medium and having an aperture positioned at which the beam spot is formed, the area of the aperture being smaller than the size of the beam spot, and a micro metal member at least part of which is positioned in the aperture. The shade and the micro metal member have the thickness of one-half or larger of a wavelength of the laser beam in the transparent condensing medium.

This aspect is characterized in that the propagation light from the aperture can be efficiently used for recording and reproduction. First, a spot having high intensity by being condensed on a light-condensed surface is emitted to an aperture having coaxial structure. Thus, by making the shade of metal and making its thickness comparatively thick, that is, one-half or thicker of a wavelength of the laser beam in the medium, the laser beam around it becomes a wave in a mode where an electric field and a magnetic field are in parallel with the metal shade and do not have a component in the propagating direction, that is, a TEM (Transverse Electromagnetic) wave. Since a wave in this mode does not have a cutoff wavelength, the wave can pass through a doughnut-shaped aperture, which is narrower than the wavelength, and to propagate without loss in principle. Furthermore, when the light enters a coaxially structural part, the spot diameter of the light spot formed by condensing the light is larger than the size of the micro metal member and the spot has wide light quantity distribution. Therefore, it is possible to supply sufficient quantity of light to the coaxially structural part. Hence, it is possible to efficiently obtain the light spot, having high intensity, from the micro aperture as a laser beam with the small spot size. Therefore it is possible to perform recording and reproduction that is efficient and has each high transfer rate. In addition, since it is possible to minimize the size of a recording mark, high-density recording becomes possible.

Furthermore, the size of the micro metal member in the present invention denotes an area of a cross-section that is perpendicular to the traveling direction of the light when the light enters the micro metal member. The shape of the micro metal member is not limited to a cylinder, but the shape can also be a polygon or a three-dimensional structure, etc.

BRIEF DESCRIPTION OF THE DRAWINGS

Preferred embodiments of the present invention will be described in detail based on the following figures, wherein.

DETAILED DESCRIPTION OF THE PREFERRED EMBODIMENTS

Figure 1A:
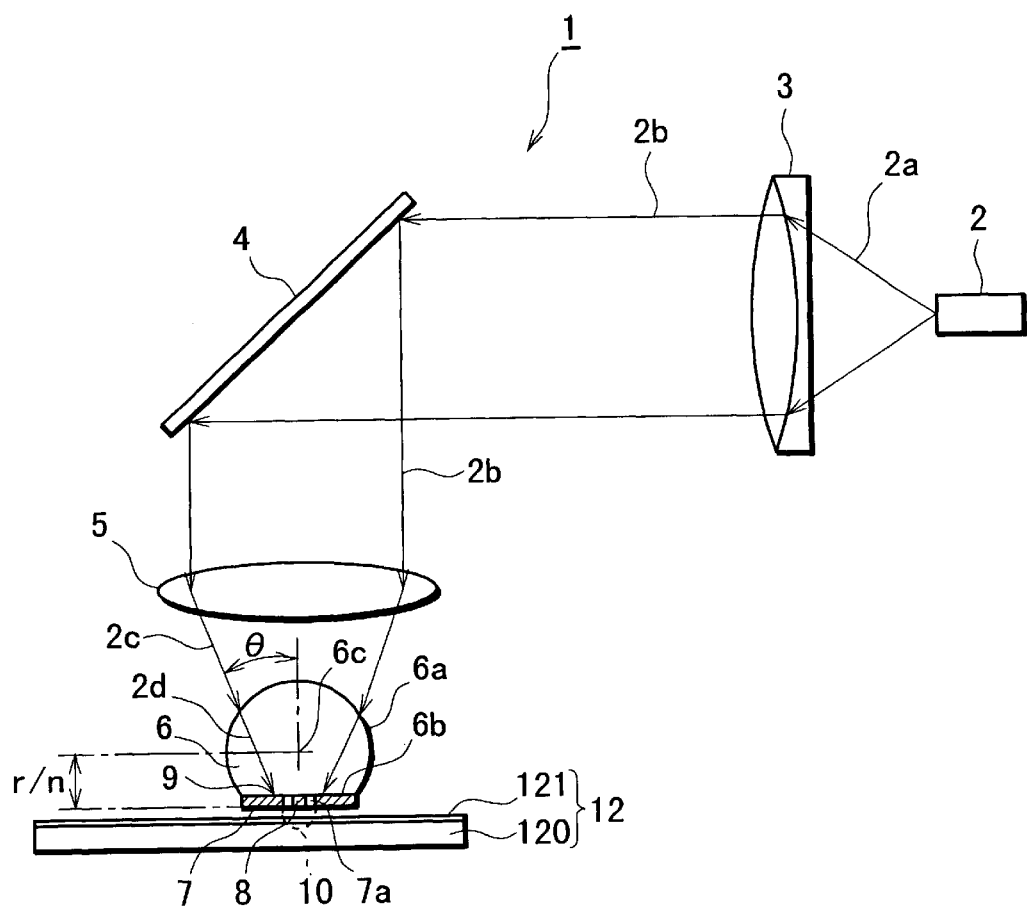
FIG. 1A is a schematic diagram showing a principal part of an optical head according to a first embodiment of the present invention.

FIG. 1A shows a principal part of an optical head 1 according to a first embodiment of the present invention. This optical head 1 has a semiconductor laser 2 emitting a laser beam 2a, a collimator lens 3 shaping the laser beam 2a from the semiconductor laser 2 into a parallel beam 2b, a mirror 4 reflecting the parallel beam 2b from the collimator lens 3 in a vertical direction, an objective lens 5 converging the parallel beam 2b reflected by the mirror 4, a transparent condensing medium 6 where light 2c converged by the objective lens 5 enters and that forms a light spot 9 on a light-condensed surface 6b, a shade 7 having an aperture 7a with the size smaller than the light spot 9 on the light-condensed surface 6b of the transparent condensing medium 6, and a micro metal member 8 provided in the center of the aperture 7a. The aperture 7a and micro metal member 8 form a doughnut-like aperture part.

As the semiconductor laser 2, a red laser (630 nm) or an AlGaInN blue laser (400 nm) can be used. By using the blue laser (400 nm), it is possible to make the diameter of a light spot be equal to or smaller than 0.13 μm, so it is possible to increase a ratio of light illuminating the aperture 7a. In addition, it is possible to use a laser that oscillates in parallel to an active layer by using a cleavage plane of a semiconductor for a laser for an optical resonator, that is, a so-called edge emitting semiconductor laser, or a laser that oscillates in a direction perpendicular to the active layer by a resonator formed in parallel to the active layer, that is, a so-called surface emitting semiconductor laser, as the semiconductor laser 2. If the edge emitting semiconductor laser is used, it is possible to shorten the distance from the collimator lens 3 because of a large beam flare angle, and hence it is possible to miniaturize the optical head. In addition, if the surface emitting semiconductor laser is used, it is possible to condense light by reducing the vignetting in the collimator lens 3 because an output beam is round, and hence it is possible to increase light efficiency.

Figure 2A:
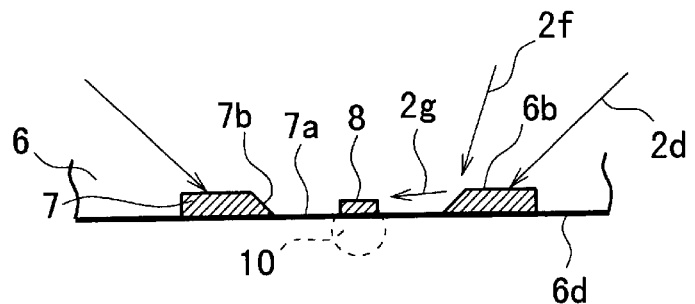
FIGS. 2A to 2D are cross-sectional views showing plasmon excitation type shades.

It is possible to use dense flint glass (refractive index= 1.91), or crystalline material such as CdS (refractive index= 2.5), and ZnS (refractive index=2.37) as the transparent condensing medium 6. In addition, there is no upper limit of the refractive index if the refractive index is larger than one, and material with a further high refractive index can also be used. In this embodiment, the dense flint glass having a refractive index of 1.91 is used. By using the crystalline material, it becomes possible to reduce the diameter of a light spot by 20% or more than that in the dense flint glass. In addition, the transparent condensing medium 6, as shown in FIG. 2A, has a bottom-cut-ball shape (Super SIL structure) so that the converged light 2c, which enters a spherical incident surface 6a, through the objective lens 5 is refracted on the incident surface 6a and refracted light 2d is condensed on the micro metal member 8 in the light-condensed surface 6b of a bottom surface.

The spot diameter of the light spot 9 is expressed by the following equation (1) if light is condensed at a position whose distance is r/n (r, n: radius and refractive index of the transparent condensing medium 6 respectively) from a spherical center 6c:

$$D_{1/2}=k\lambda/(n \cdot NAi)=k\lambda/(n^2 \cdot NAo) \quad (1)$$

Herein, $D_{1/2}$: Spot diameter at a position where light intensity becomes one-half k: Proportional constant depending on light beam intensity profile (usually, nearly 0.5)

λ: Wavelength of light beam n: Refractive index of the transparent condensing medium 6

NAi: Numerical aperture inside the transparent condensing medium 6

NAo: Numerical aperture of incident light to the transparent condensing medium 6

The light spot 9, as shown in equation (1), is minimized in inverse proportion to the refractive index n of the transparent condensing medium 6, so it becomes possible to condense light with small spherical aberration. Nevertheless, there is contradictory relation between an available incident angle θ of converged light 2c, that is, the numerical aperture NAo, and the refractive index n, therefore it is not possible to enlarge both numbers separately. A product of the refractive index n and the maximum value of the NA is nearly 0.88, and actually this becomes 0.8 or less due to the eclipse of a beam. Therefore, the minimum diameter $D_{1/2}$ min of a light spot is expressed in the following equation (2):

$$D_{1/2}\ min=k\lambda/(0.8n) \sim 0.6\lambda/n (at\ k=0.5) \quad (2)$$

If the dense flint glass having the largest refractive index (=1.91) in non-crystals as the transparent condensing medium 6 and a red laser (wavelength=630 nm) is used as the semiconductor laser 2, the minimum diameter of a light spot $D_{1/2}$ min is 0.20 μm. In addition, if a blue laser (400 nm) is used, the minimum diameter of a light spot $D_{1/2}$ min is nearly 0.13 μm. Furthermore, their light spots 9 have Gaussian intensity distribution.

Figure 1B:
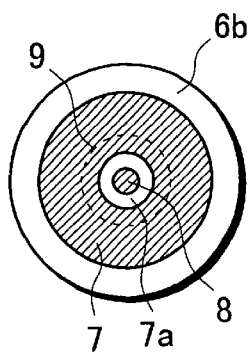
FIGS. 1B to 1E are diagrams showing shapes of shades.
Figure 1C:
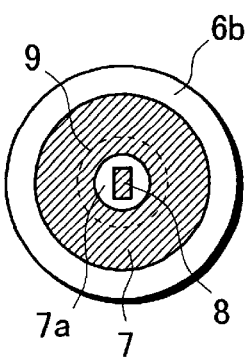
Figure 1D:
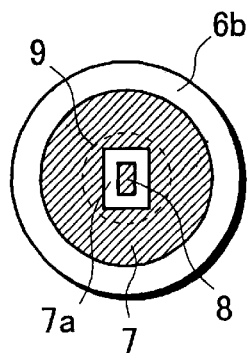
Figure 2B:
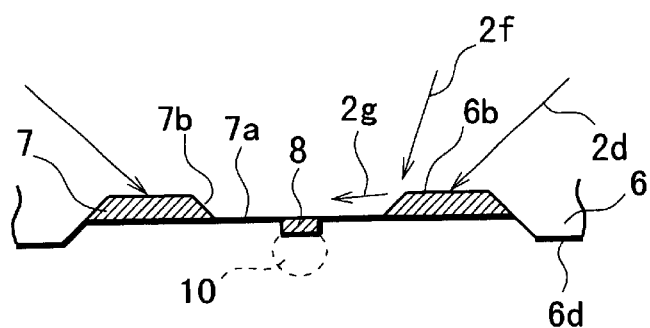
Figure 2C:
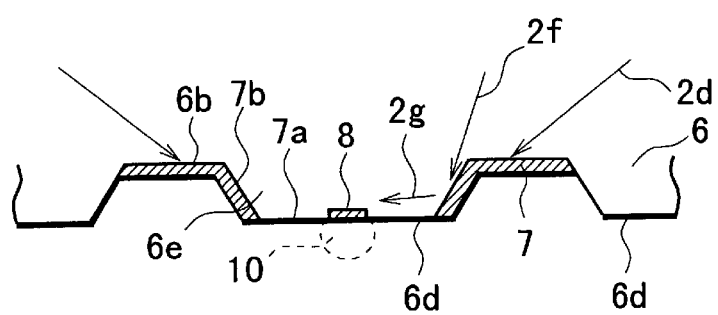
Figure 2D:
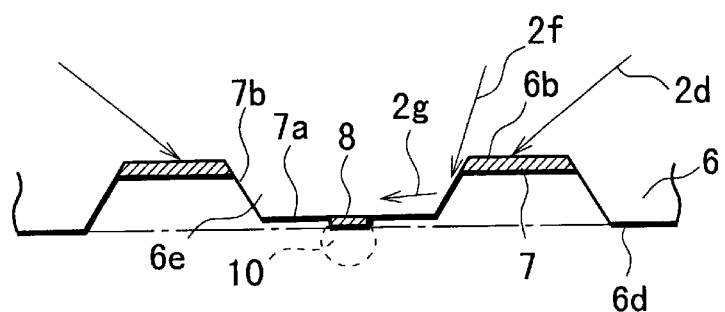

FIGS. 1B to 1D show top views of the shades 7 and micro metal members 8. Although, in this embodiment, the shape of the aperture 7a of the shade 7 is circle as shown in FIGS. 2B and 2C, as shown in FIG. 2D, the shape can also be a rectangle smaller than the diameter of the light spot 9 or another shape, for example, an ellipse. In addition, although, in this embodiment, the shape of the micro metal member 8 is circle as shown in FIG. 2B, as shown in FIGS. 2C and 2D, the shape can also be a rectangle or an ellipse. The process using photolithography for the micro metal member 8 having a round shape is advantageous because of the easiness in manufacturing. Making the shape of the micro metal member 8 rectangle whose long sides are orthogonal to a tracking direction, it is possible to minimize the size of near field light spreading in the tracking direction. Therefore, the length of the recording mark becomes short in the tracking direction in comparison with a circle, it becomes possible to perform the high-density record. If a shape of the micro metal member 8 is an ellipse whose ellipse axis is parallel to the direction orthogonal to the tracking direction, not only the length of the recording mark in the tracking direction becomes short, but also the generation of near field light caused by plasmon resonance is enforced. Therefore, lower input level can be used. In this embodiment, the diameter of the aperture 7a of the shade 7 is made to be 0.1 μm, and the outside diameter of the micro metal member 8 is 50 nm. The size of the near field light 10 leaking out from the aperture 7a almost depends on the size of the micro metal member 8. In addition, the size of the micro metal member 8 can be minimized to the size less than 50 nm according to the progress of high-density recording technology and shade forming technology for optical disks.

Figure 1E:
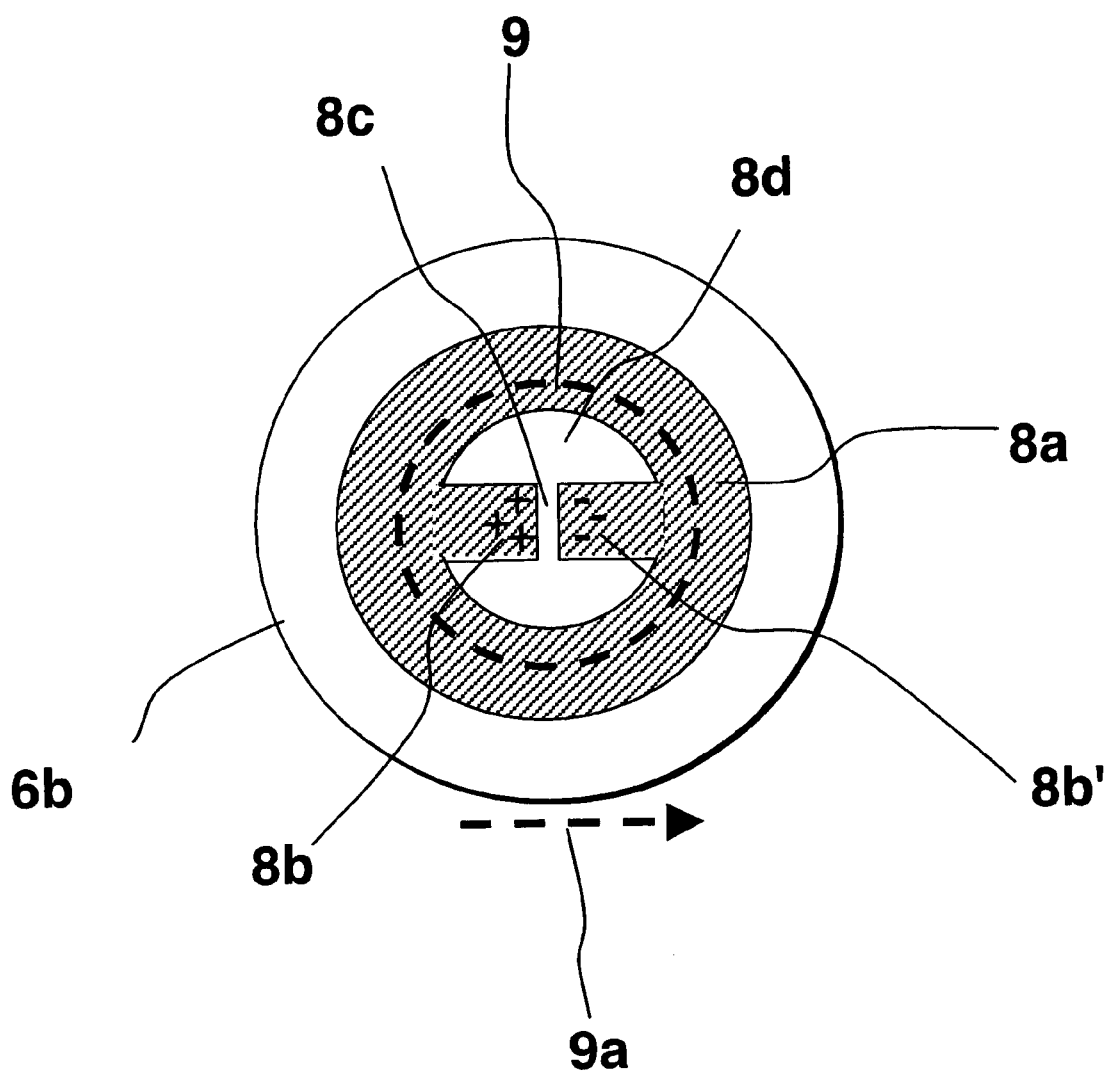

As shown in FIG. 1E, a metal body which has an aperture 8d in it can be applied instead of the metal body 8 shown in the FIG. 1D, where the central part of the aperture is narrowed to construct a slit-like gap 8c the size of which is far less than that of the beam spot 9. The direction of the longer side of the gap 8c is placed to traverse the recording track (not shown in the figure). By irradiating the gap 8c with the converging incident beam 2d and arranging the polarization 9a of the converging incident beam 2d to cross over the gap 8c, as shown in the same figure, electric charges having opposite polarities with each other are induced effectively by the plasmon in the both outer sides of gap 8b and 8b', respectively. The induced electric charges construct an electric dipole which generates a strong near-field light effectively the length of which is nearly equal to that of the gap 8c. As the area of the near-field light generated with the plasmon excitation is limited around the gap 8c, both the width and length of the near-field light is miniaturized far less than the size of the beam spot 9, which makes it possible to form smaller recording marks.

FIGS. 2A to 2D show cross sections of the shades 7 and micro metal bodies 8. The micro metal bodies 8 are thinner than the shades 7. For example, let the thickness of the shade 7 be 50 nm, and the thickness of the micro metal member 8 is made to be nearly 20 nm. It is possible to reduce the generation of the near field light in that area by thickening the shade 7, and it is possible to excite plasmon and to efficiently generate the near field light in a recording medium side, by thinning the micro metal member 8. In addition, the shade 7 and micro metal member 8, as shown in FIG. 2A, can also be embedded inside the bottom surface 6d of the transparent condensing medium, or can also be formed so as to extrude outside of the light-condensed surface 6b. In addition, as shown in FIG. 2B, it can be performed that the shade 7 is embedded inside the transparent condensing medium and the micro metal member 8 is formed so as to extrude outside the bottom surface 6d. If the shade 7 or the micro metal member 8 is embedded, it is good enough to form such configuration that a surface of the shade 7 or micro metal member 8 is flush with the bottom surface 6d of the transparent condensing medium 6, or is embedded inside the bottom surface 6d. Owing to this, it is possible to prevent the shade 7 and micro metal member 8 from contacting with the recording medium 121. In addition, an edge 7b of the aperture 7a of the shade 7 can also be an inclined plane as shown in FIGS. 2A to 2D. Owing to this, it is possible to reflect the converged light 2f toward 2g, and to efficiently irradiate the micro metal member 8. By making a periphery 6e of the micro metal member 8 in the transparent condensing medium 6 be tapered as shown in FIGS. 2C and 2D, it is possible to further increase light-condensing efficiency. The tapered inclined plane can also be covered by the shade 7 as shown in FIG. 2C, or cannot be covered as shown in FIG. 2D.

Although the micro metal member 8 can be made of any metal, it is preferable to be selected from material having good adherence to the transparent condensing medium 6, such as Ti, and/or material easily generating excitation of the plasmon resonance. In particular, by using metal having small dielectric constant, such as Ag, it is easily to attain the condition of plasmon resonance. The conditions of the plasmon resonance is expressed as the following equation (3) if excitation is primary mode excitation (Reference: Near field nanophotonics handbook: Optoronics Co., Ltd., p. 177 (1997)):

$$Re[Em(a)] = -2 \cdot E(a) \quad (3)$$

Herein,

Em(a): Dielectric constant of the micro metal member 8

Ed(a): Dielectric constant of medium surrounding the micro metal member 8

As is evident from this equation, if outer medium is air, a case of the dielectric constant of the micro metal member 8 being −2 fulfills the resonance condition. Under this condition, the intensity of the near field light gains several digits of multiplication, and under a condition near to this condition, it is possible to obtain an enhancing effect enabling one-digit or more of multiplication.

Figure 3A:
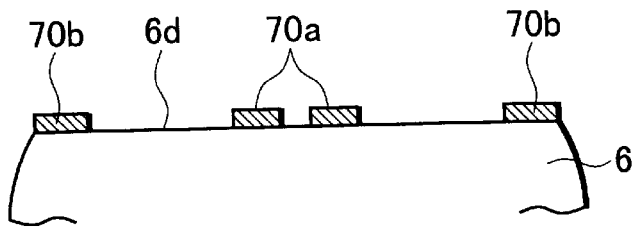
FIGS. 3A to 3D are cross-sectional views showing a forming method of a shade according to the first embodiment.
Figure 3B:
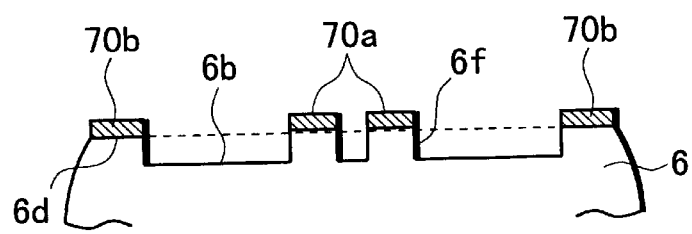
Figure 3C:
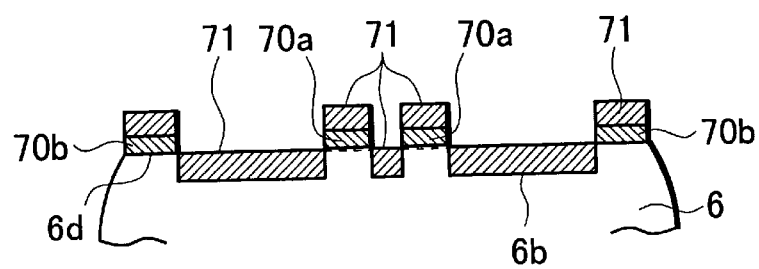
Figure 3D:
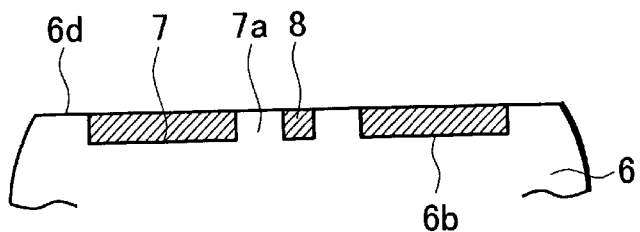
Figure 4A:
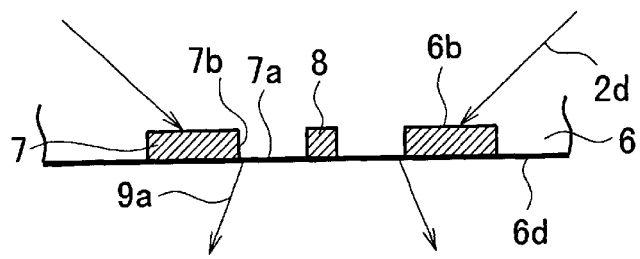
FIGS. 4A to 4D are cross-sectional views of principal parts showing light-condensing parts of optical heads according to a second embodiment of the present invention.
Figure 4B:
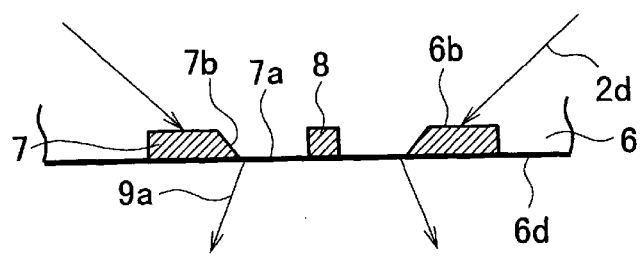
Figure 4C:
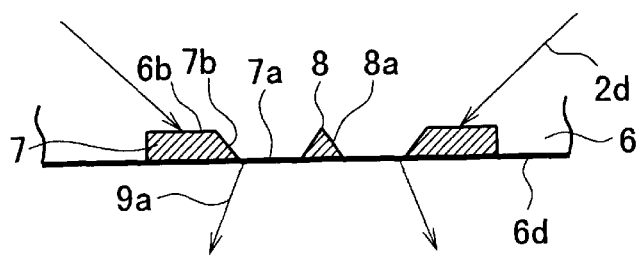
Figure 4D:
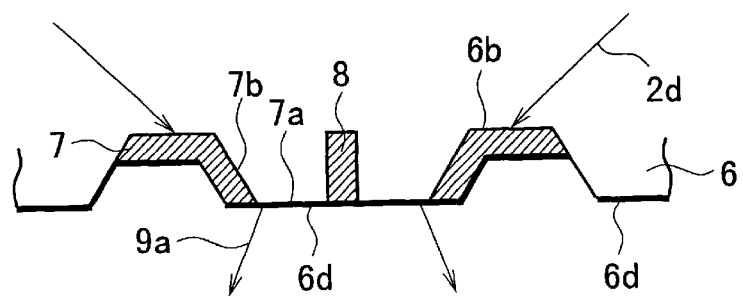

The shade 7 is not limited to metal. A reflective film composed of dielectric multilayer film can also be used. Nevertheless, in this case, in order to increase shading efficiency, film thickness must be thicker than that in the case of metal, FIGS. 3A to 3D show a batch forming process of the shade 7 and micro metal member 8. First, a photoresist film for electron beam exposure is coated on the bottom surface 6d of the bottom-cut-ball-shaped transparent condensing medium. As shown in FIG. 3A, the photoresist film is exposed by the electron beam so that a part 70a of the photoresist film corresponding to the doughnut-like aperture part and a part 70b of the photoresist film corresponding to the periphery of the shade 7 are left. After developing, as shown in FIG. 3B, the bottom surface 6d is anisotropically etched at a depth of nearly 50 nm by dry etching to form the light-condensed surface 6b that is an adherend of the shade 7. Etching gas is $CF_4$ gas. Next, as shown in FIG. 3C, after a Ti film 71 for the shade 7 and micro metal member 8 is deposited on the entire surface at a thickness of nearly 50 nm by sputtering, the photoresist film 70 (70a and 70b) is dissolved. Then, as shown in FIG. 3D, the Ti film 71 except the parts of the shade 7 and micro metal member 8 is lifted off. In this manner, the shade 7 and micro metal member 8 are formed in one lump. In addition, the Ti film can be replaced by another film having good adherence to glass. A focused ion beam method can be used for adhesion of the shade 7, and in particular, the micro metal member 8. It becomes possible to omit the lift-off process. Furthermore, by using the above-described manufacturing methods, it becomes possible to comparatively freely arrange shapes of the shade 7 and micro metal member 8.

In addition, if the shade 7 and micro metal member 8 are embedded into the bottom surface 6d of the transparent condensing medium, such as this embodiment, the flatness of the bottom surface 6d becomes improved, so this is preferable for the transparent condensing member to fly over the recording medium 121. In addition, if the shade 7 and micro metal member 8 are formed so as to protrude outside the light-condensed surface 6b, it is possible to form the shade 7 and micro metal member 8 by only the focused ion beam method, and hence it is possible to simplify the process. Furthermore, since it is possible to keep a larger distance between the light-condensed surface 6b and recording medium 121, an interaction between the propagation light, coming from the light spot 9 around the micro metal member 8, and the recording medium 121 is decreased. Hence it is possible to prevent record to and reproduction from the portion of the recording medium 121 positioned outside of the micro metal member 8, and therefore, recording density can be increased with an S/N ratio of a signal being increased.

Next, the operation of the optical head 1 according to the first embodiment will be described. When a laser beam 2a is emitted from the semiconductor laser 2, the laser beam 2a is collimated to a parallel beam 2b by the collimator lens 3, and is reflected by the mirror 4. After that, the parallel beam 2b is converged by the objective lens 5, and enters the incident surface 6a of the transparent condensing medium 6. Converged light 2c entered into the incident surface 6a is refracted on the incident surface 6a, and refracted light 2d is condensed on the light-condensed surface 6b, on which the light spot 9 is formed. The near field light leaks out in a place of this light spot 9 between the aperture 7a and micro metal member 8 in an outer surface of the light-condensed surface 6b, that is, the doughnut-like aperture part, and is scattered by the micro metal member 8. In addition, since plasmon is excited by emission of the laser beam in the micro metal member 8, the near field light 10 leaks out therefrom. This near field light 10 enters the recording medium 121 of the disk 12 as the propagation light, recording in the recording medium 121 is performed by this light. In addition, at the time of reproduction, the reflected light from the recording medium 121 is returned to the transparent condensing medium 6 through the aperture 7a, and is guided by a detection optical system. Then, reproduction signal processing is performed.

According to the optical head 1 according to the above-described first embodiment, the size of the near field light 10 leaking out from the doughnut-like aperture part B becomes nearly equal to the size of the micro metal member 8.

Therefore, it is possible to drastically minimize the size of the near field light 10 in comparison with a case only having an aperture.

Furthermore, by using the plasmon resonance, it becomes possible to increase the intensity of near field light by one digit or more of multiplication in comparison with a case where the near field light merely leaks out from a light spot on a light-condensed surface. Therefore, it is possible to obtain high light efficiency. Hence, the semiconductor laser 2 having comparatively low power, that is, several mW can be used as a light source.

In addition, the reflected light from the recording medium 121 at the time of reproduction enters the transparent condensing medium 6 though the aperture 7a that is comparatively large in comparison with the size of the micro metal member 8. Therefore, it is possible to efficiently detect reproduced light, and hence it is possible to increase an S/N ratio of a reproduced signal. In consequence, since an Si photo detector having been commonly used in optical disk memory up to now can be used, it is unnecessary to use a photo multiplier. Therefore, it is possible not only to miniaturize and lighten the optical head 1, but also to perform high-speed reading.

Furthermore, the shade 7 can prevent the light to enter into the recording medium 121 at a periphery of the light spot 9. Therefore, it is possible to prevent the bad influence on the recording by the variation of a position or a diameter of a light spot caused by the position shift or the thermal expansion of the optical system. Hence, manufacturing conditions of the optical head are drastically relaxed. Moreover, it is possible to reduce the incidence of unnecessary light on the recording medium at the time of the record and the reduction in comparison with a case of obtaining near field light by irradiating a metal member only with a laser beam.

In addition, it is possible to form an antireflection film (not shown), which is suitable to a wavelength of a laser beam that is used, on a surface of the light-condensed surface 6b of the doughnut-like aperture part. Owing to this, it becomes possible to increase incident efficiency of the reflected light for the reproduction of a signal into the transparent condensing medium 6.

Furthermore, it is possible to insert a shading plate (not shown), which is round or rectangular, in an optical path of the laser beam 2a or the parallel beam 2b before entering the transparent condensing medium so as to shield at least the central part of the laser beam. By this configuration, a laser beam condensed on the light-condensed surface 6b is totally reflected on the light-condensed surface 6b, and hence there is no component propagating through the aperture 7a, substantially. Therefore, it is possible to suppress the occurrence of erroneous recording and erroneous reproduction caused by the beam from the aperture part having relatively larger diameter to the micro metal member 8.

FIG. 4 shows a doughnut-like aperture part of an optical head according to a second embodiment of the present invention. In this embodiment, the structure of the doughnut-like aperture part is made to be coaxial structure suitable to the generation of propagation light rather than near field light, and the structure is the same as that in the first embodiment except this feature. In order to generate the propagation light, as shown in FIG. 4, the thickness of the shade 7 and micro metal member 8 is made to be thick so that the thickness is one-half or more of a wavelength of a laser beam in the transparent condensing medium 6. Owing to this, as for vectors of an electric field and a magnetic field of the laser beam 2d converged, components in a traveling direction are reduced, and components in the same plane as that of metal members (the shade 7 and micro metal member 8) become major. Therefore, the laser beam 2d becomes like a TEM wave. Not having a cutoff wavelength such like a propagation mode in a coaxial cable, an electromagnetic wave in this mode can propagate through the aperture 7a with the size equal to or smaller than a wavelength. Therefore, even if the outside diameter of the doughnut-like aperture part, that is, the diameter of the aperture 7a provided in the shade 7 is made to be small, nearly 50 nm, for example, it is possible to efficiently introduce propagation light, and hence it is possible to perform high-density recording and reproduction. A wavelength of a blue laser becomes nearly 200 nm in the transparent condensing medium 6 made of dense flint glass. Then, in this embodiment, a blue laser with the wavelength of 400 nm is used as a light source, and an Ag film with 50 nm diameter of the aperture 7a and of 100 nm thickness is coated as the shade 7. Cross sectional forms of the shade 7 and micro metal member 8 may have tapered surfaces 7b, and 8a as shown in FIGS. 4B and 4C, or the entire doughnut-shaped aperture part may be tapered as shown in FIG. 4D. Furthermore, although drawing is omitted, a light emission side of the tapered surfaces 7b and 8a in FIGS. 4B to 4D may be cylindrical. By these modification, it is possible to further increase light-condensing efficiency. In addition, as shown in FIGS. 4A to 4D, a part of the transparent condensing medium 6 surrounds the micro metal member 8 inside the aperture, and the shade 7 and micro metal member 8 are constructed in the side of the light-condensed surface 6b of the transparent condensing medium 6.

Although it is not always necessary to make the transparent condensing medium 6, shade 7, and micro metal member 8 flat in the side of the light-condensed surface 6b, making these flat further increases the propagation efficiency of the propagation light.

The size of the micro metal member 8 should be smaller than the size of a light spot at an incident place of the light spot condensed. In order to increase the propagation efficiency, the diameter of the light spot should be larger than the aperture size. If the diameter of the light spot is one-third of the outside diameter of the doughnut-shaped aperture part, light loss can be minimized. Thus, when the outside diameter of the doughnut-shaped aperture part is set to 50 nm, the size of the micro metal member 8 can be designed to nearly 16 nm. In this embodiment, it is set to 20 nm.

In this manner, similarly to the first embodiment, though the size of the light emitting from the aperture 7a is minute, that is, 50 nm diameter, the propagation light is introduced, and therefore it is possible to efficiently obtain the light with high light intensity. It is thus possible to efficiently perform high-density recording and reproduction.

In addition, in this embodiment, since the propagation light is efficiently introduced from the doughnut-shaped aperture part and can be entered to the recording medium, the recording medium and optical head optical system strongly interconnect with each other. Therefore, by using this recording medium or the shade 7 and the micro metal member 8 as one mirror of an optical resonator of a semiconductor laser, so-called SCOOP type reproduction signal detection which utilizes the self-connection effect of a semiconductor laser, can be applied.

Figure 5:
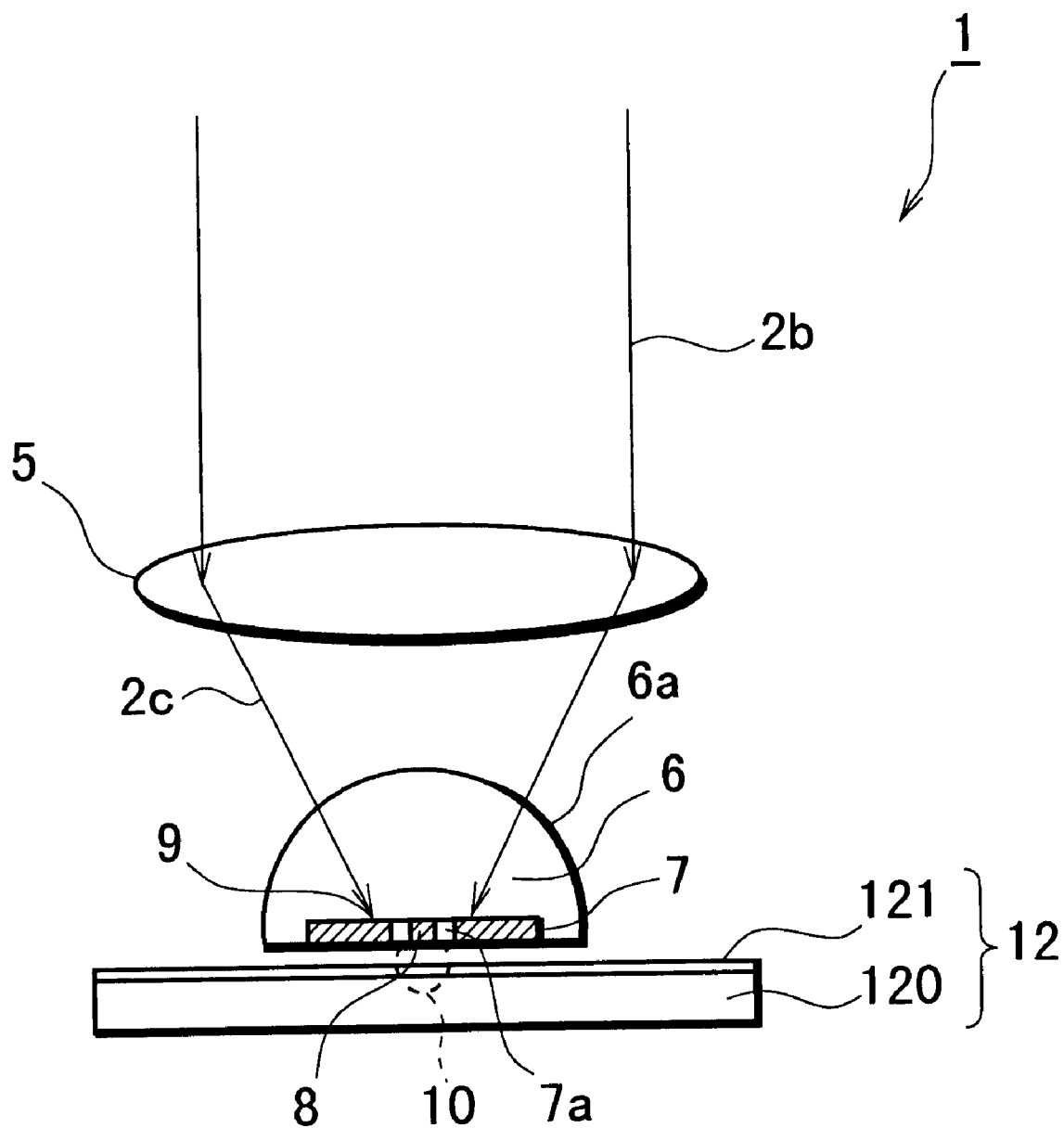
FIG. 5 is a schematic diagram showing a principal part of an optical head according to a third embodiment.

FIG. 5 shows a principal part of an optical head according to a third embodiment of the present invention. This optical head 1 is obtained by making the transparent condensing medium 6 be hemispherical (Solid Immersion Lens: SIL type), and other components are configured similarly to those in the first embodiment. Converged light 2c entering an incident surface 6a of the transparent condensing medium 6 is condensed at the center of a sphere. In this case, since the converged light 2c is not refracted on the incident surface 6a, a numerical aperture NA in the transparent condensing medium 6 is not changed from the numerical aperture NA at the time of emitting from the objective lens 5. Therefore, it is not possible to increase the numerical aperture NA by refraction. Hence, the diameter of a light spot at this time becomes as the following equation (4):

$$D_{1/2} = k\lambda/(n \cdot NAo) \tag{4}$$

Herein, NAo: Numerical aperture of incident light into the SIL type transparent condensing medium 6.

According to the optical head 1 according to the third embodiment, similarly to the first embodiment, the diameter of the near field light 10 is determined by the size of the micro metal member 8, and does not depend on the diameter of the light spot 9. Therefore, since the diameter of the near field light 10 is hardly affected by aberration, positional shift, and the like, it is possible to comparatively enlarge the numerical aperture NAo to 0.8 in comparison with a case of a conventional SIL type optical head. Hence it is possible to condense light as same as the Super SIL structure in the first embodiment does.

Figure 6A:
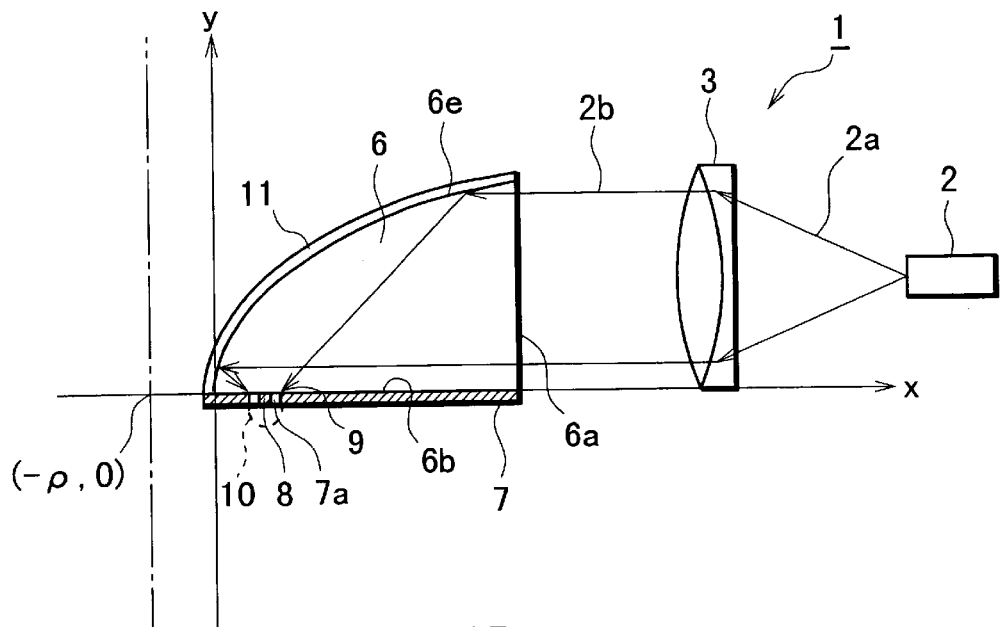
FIG. 6A is a schematic diagram showing a principal part of an optical head according to a fourth embodiment of the present invention.
Figure 6B:
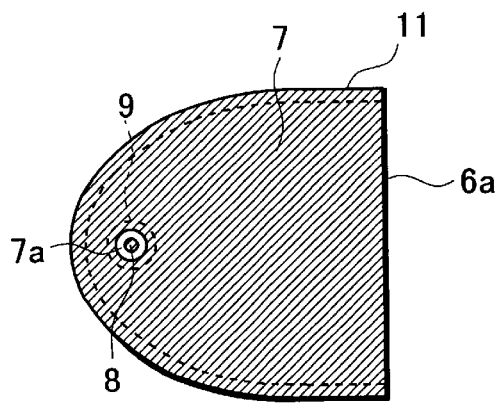
FIG. 6B is its bottom view.

FIGS. 6A and 6B show a principal part of an optical head according to a fourth embodiment of the present invention. As shown in FIG. 6A, this optical head 1 has a semiconductor laser 2 emitting a laser beam 2a, a collimator lens 3 shaping the laser beam 2a from the semiconductor laser 2 into a parallel beam 2b, a transparent condensing medium 6 that condenses the parallel beam 2b from the collimator lens 3 and forms a light spot 9 on a light-condensed surface 6b, and a reflective film 11 formed on a reflecting surface 6e of the transparent condensing medium 6. On the light-condensed surface 6b of the transparent condensing medium 6, similarly to the first or second embodiment, a shade 7 having an aperture 7a and a micro metal member 8 are provided.

The transparent condensing medium 6 is made of, for example, dense flint glass (refractive index: 1.91), and has an incident surface 6a where the parallel beam 2b enters, a reflecting surface 6e reflecting the parallel beam 2b entering the incident surface 6a, and the light-condensed surface 6b where the light spot 9 is formed.

The reflecting surface 6e uses part of a paraboloid of revolution. When a principal axis of a cross section (6e) of the paraboloid of revolution is defined as x-axis and a vertical axis is set as y-axis, and a focal position is set as (p, 0), the cross sectional fringe (6e) is expressed in the following equation (5):

$$y^2 = 4px \tag{5}$$

In addition, in case light is condensed inside the transparent condensing medium 6 by using the paraboloid of revolution, it is possible to condense the light theoretically with no aberration (Hiroshi Kubota, Optics, Iwanami Shoten, Publishers, p. 283) and it is possible to condense the light spot 9 with a single light-condensing reflector. In addition, in this method, there is no limitation in the numerical aperture NA of the condensed light that is caused by the refractive index of the transparent condensing medium 6 and the reflecting surface 6e. Therefore, even if the refractive index is high, the numerical aperture NA can become a value near to one. Hence, the diameter of the light spot is expressed in the following equation (6):

$$D_{1/2} = k\lambda/(n \cdot NAr) \tag{6}$$

Where, NAr: Numerical aperture NA of reflected light on the reflecting surface 6e.

When the distance p of a focal position of the paraboloid of revolution is 0.125 mm and an upper end of the paraboloid of revolution be (x, y)=(2 mm, 1 mm), a convergent angle from this upper end becomes 60° or larger, the numerical aperture NA of this reflecting surface 6e becomes 0.98, which is 1.6 times or more larger than the numerical aperture NA (=0.6) in a conventional DVD.

According to the optical head 1 according to the fourth embodiment, the numerical aperture NAr is actually limited to nearly 0.9 because of the design margin, but, if a red laser (wavelength: 630 nm) and a blue laser (wavelength: 400 nm) are used, respective diameters of light spot can be decreased to 0.19 μm and 0.12 μm. Therefore, it is possible to increase the quantity of light, that is, light efficiency of the near field light 10 leaking out from the micro metal member 8, nearly 20% higher in comparison with that in the first embodiment.

In addition, chromatic aberration cannot be arisen due to using reflective condensing.

Furthermore, the optical system of this embodiment is an infinite system, that is, such a system that the laser beam 2b between the collimator lens 3 and incident surface 6a of the transparent condensing medium 6 is parallel. Therefore, the shift of a focal position due to thermal variation is small.

Moreover, since the paraboloid of revolution is used in the reflecting surface 6e of the transparent condensing medium 6, a position of the light spot is not changed even if a relative position between the parallel beam 2b and transparent condensing medium 6 is shifted. Therefore, since alignment accuracy of each component can be drastically relaxed, this is very advantageous in manufacturing.

Figure 7:
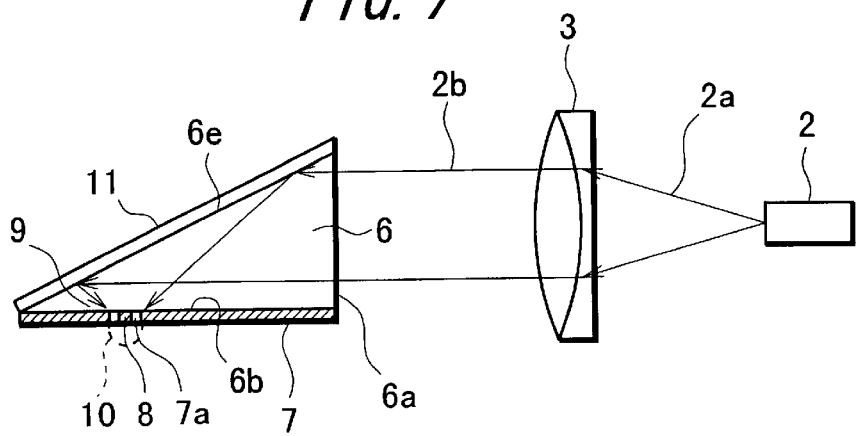
FIG. 7 is a schematic diagram showing a principal part of an optical head according to a fifth embodiment of the present invention.

FIG. 7 shows a principal part of an optical head according to a fifth embodiment of the present invention. This optical head 1 uses a transparent condensing medium 6 having a flat reflecting surface 6e and uses a reflection type hologram as a reflective film 11 on the reflecting surface 6e. Other components are configured similarly to those in the fourth embodiment. Either a binary hologram, which is concavo-convex, or a volume hologram, which is made of organic photosensitive material and the like, can be used as the reflection type hologram. In addition, a reflective film, composed of a highly reflective metal layer such as an aluminum layer, may be formed on the outside of these holograms. By flattening the reflecting surface 6e of the transparent condensing medium 6, the productivity in comparison with that in the fourth embodiment will be improved.

Figure 8A:
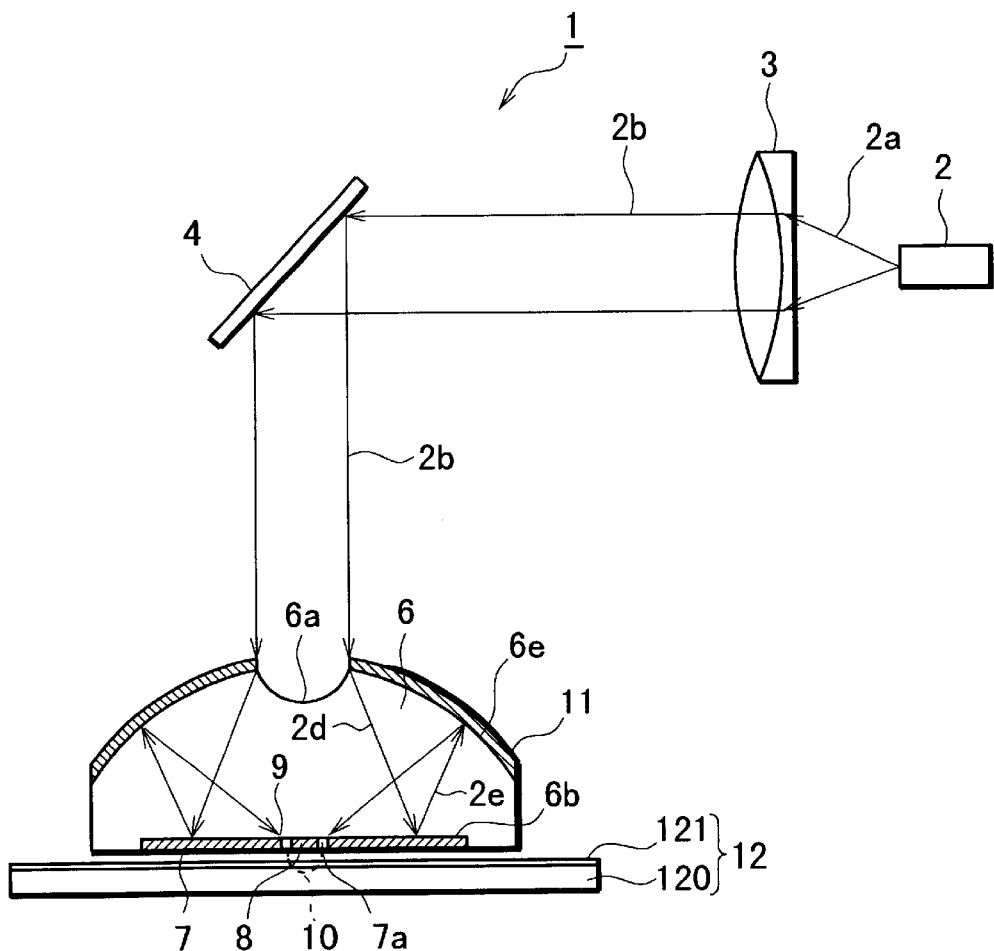
FIG. 8A is a schematic diagram showing a principal part of an optical head according to a sixth embodiment of the present invention.
Figure 8B:
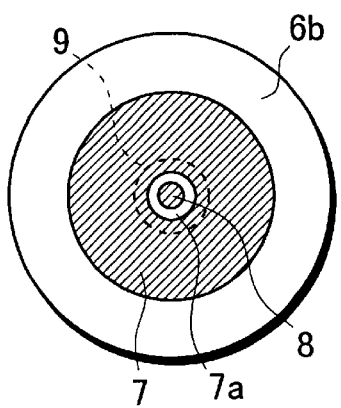
FIG. 8B is a cross-sectional view showing its shade.

FIG. 8 shows a principal part of an optical head according to a sixth embodiment of the present invention. This optical head 1, as shown in FIG. 8A, uses a so-called SIM (Solid Immersion Mirror) type optical part for the transparent condensing medium 6. This optical head 1 has a semiconductor laser 2 emitting a laser beam 2a, a collimator lens 3 shaping the laser beam 2a from the semiconductor laser 2 into a parallel beam 2b, a mirror 4 vertically reflecting the parallel beam 2b from the collimator lens 3, a transparent condensing medium 6 that has a concave incident surface 6a where the parallel beam 2b from the mirror 4 enters, a light-condensed surface 6b provided at a position of facing the incident surface 6a, and a concave reflecting surface 6e formed around the incident surface 6a, and a reflective film 11 coated on the reflecting surface 6e of the transparent condensing medium 6. Then, on the light-condensed surface 6b of the transparent condensing medium 6, similarly to the first or second embodiment, a shade 7, having an aperture 7a, and a micro metal member 8 are provided.

The operation of the optical head 1 according to the sixth embodiment is described next. When a laser beam 2a is emitted from the semiconductor laser 2, the laser beam 2a is shaped by the collimator lens 3, and is reflected by the mirror 4. After that, the reflected beam enters the incident surface 6a of the transparent condensing medium 6. The parallel beam 2b entering the incident surface 6a is diffused on the incident surface 6a, and the diffused light 2d is reflected on the shade 7. The reflected light 2e is reflected on the reflective film 11, and is condensed on the light-condensed surface 6b. A light spot 9 is formed on the light-condensed surface 6b, and near field light 10 leaks out from the micro metal member 8. The near field light 10 leaking out from the micro metal member 8 enters a recording medium 121 of a disk 12, and owing to this light, it becomes possible to record data to and read data from the recording medium 121.

According to the optical head according to the above-described sixth embodiment, similarly to the first embodiment, it is possible not only to increase recording density in the tracking direction X, but also to simplify configuration since the objective lens used in the first embodiment can be omitted. In addition, since a condensing point is not changed even if the transparent condensing medium 6 expands or shrinks, the optical head 1 can stand the temperature change.

Figure 9A:
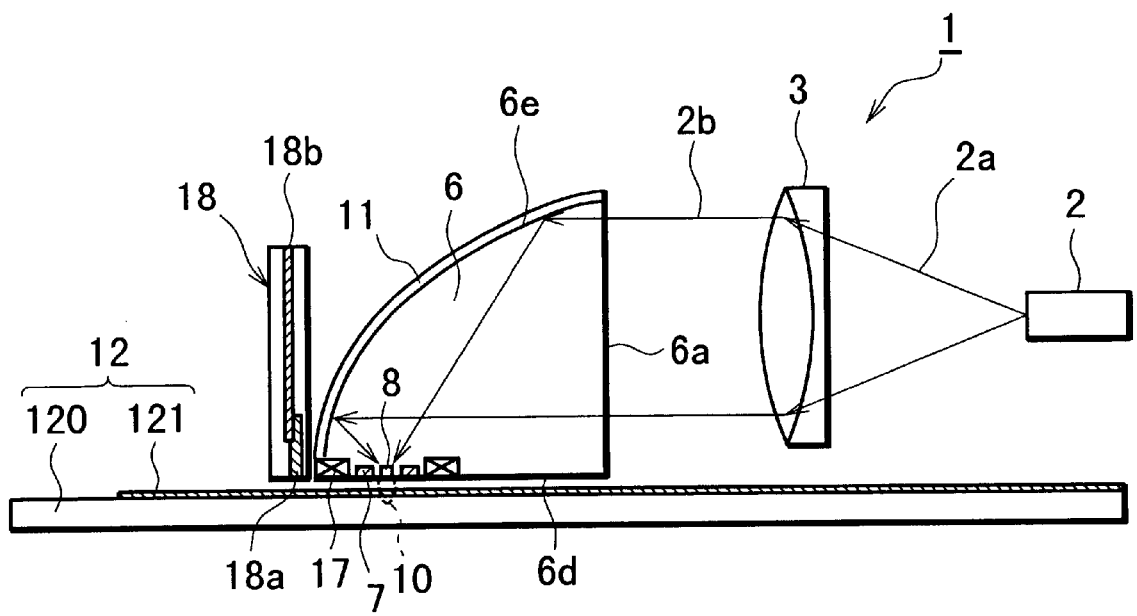
FIG. 9A is a schematic diagram showing a principal part of an optical head according to a seventh embodiment of the present invention.
Figure 9B:
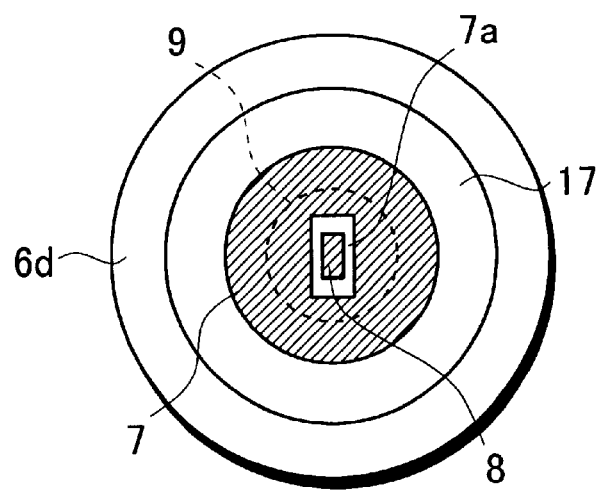
FIG. 9B is a bottom surface of the principal part.

FIGS. 9A and 9B show a magneto-optical head according to a seventh embodiment of the present invention. This embodiment is a magneto-optical head suitable to optically assisted magnetic recording. This embodiment is different from the fourth embodiment in using a GMR (Giant Magneto-resistive) sensor 18, which mainly composed of a spin valve film 18a and an electrode 18b for reproduction, and in using an electromagnet 17 besides a laser beam 10 for recording. Other components are constructed similarly to the fourth embodiment. According to such configuration, recording is performed in a magnetic recording medium 121 by irradiating and heating a recording part of the magnetic recording medium 121 with the near field light 10 leaking out from the micro metal member 8, then reducing a coercive force thereby, and applying a modulation magnetic field produced by the electromagnet 17. A usual in-plane recording film or a vertical recording film such as a Co—Cr—Ta film, magneto-optical recording film such as a TbDyFeCo/TeFeCo film, and the like can be used as the magnetic recording medium 121.

In addition, by using the shade 7 and micro metal member 8 of the second embodiment, heat-recording by irradiating the recording medium 121 with propagation light emitted from the aperture 7a may also be applied. In this embodiment, since the GMR sensor having a rectangular detector (not shown) is used for reproduction, it is possible to make a shape of a recording mark coincide with a shape of the GMR sensor by making a shape of the micro metal member 8 or a shape of the aperture 7a also be rectangular. Therefore, it is possible to increase resolution at the time of reproduction and to realize high density.

According to this seventh embodiment, recording is performed by reducing a coercive force through heating the magnetic recording medium 121 by the near field light 10. Therefore, it is possible to perform recording even in a magnetic medium having a high coercive force at room temperature, and hence it is possible to increase thermal stability of recorded mark. In consequence, a recording magnetic domain become shrink, so the high density recording can be attained.

Figure 10A:
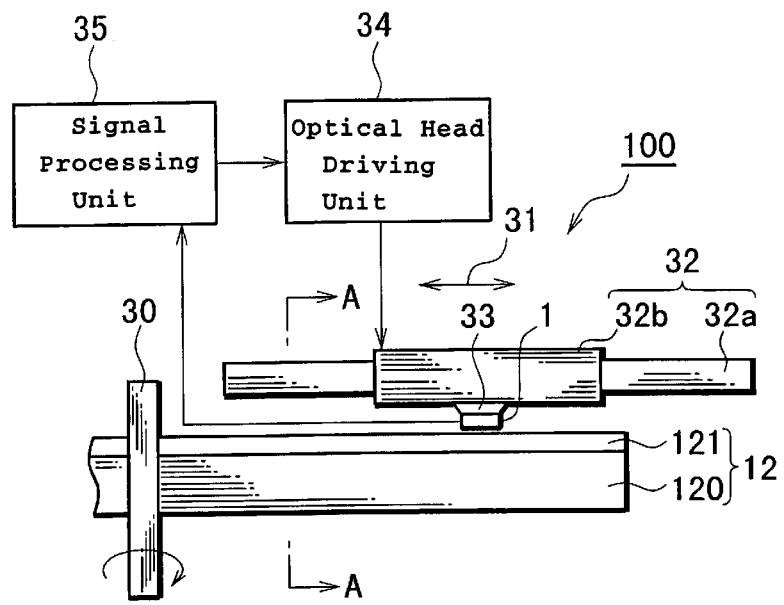
FIG. 10A is a schematic diagram showing a disk apparatus according to an eighth embodiment of the present invention.
Figure 10B:
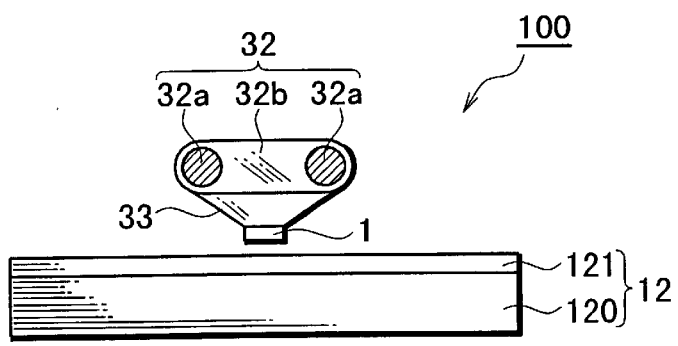
FIG. 10B is a cross-sectional view taken on line A—A of FIG. 10A.

FIGS. 10A and 10B show a disk apparatus according to an eighth embodiment of the present invention. A recording medium 121 made of GeSbTe phase change material is formed on one side of a plastic disk 120. This disk apparatus 100 has an optical disk 12 rotated by a motor, not shown, through a rotary shaft 30, an optical head 1 performing optical recording and reproduction to the recording medium 121 of the optical disk 12, a linear motor 32 moving the optical head 1 in the tracking direction 31, a suspension 33 supporting the optical head 1 from a side of the linear motor 32, an optical head driving unit 34 driving the optical head 1, and a signal processing unit 35 that not only processes a signal obtained from the optical head 1 but also controls the optical head driving unit 34. The linear motor 32 includes a pair of fixed parts 32a provided along the tracking direction 31, and a moving-coil 32b moving on the pair of fixed parts 32a. The optical head is supported by the above-described suspension 33 attached to the moving-coil 32b.

Figure 11:
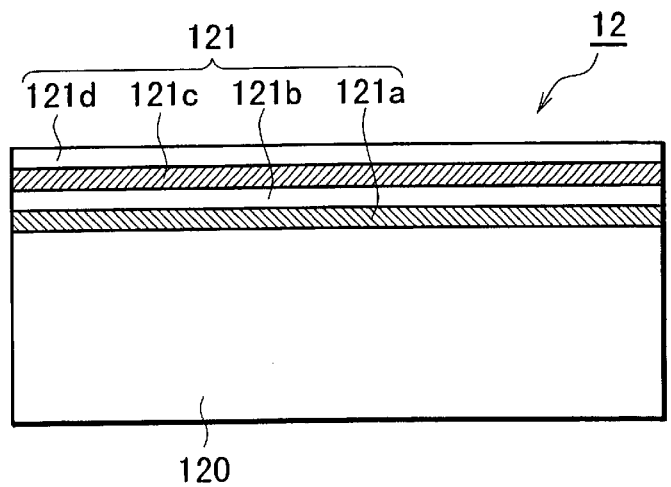
FIG. 11 is a cross-sectional view showing details of an optical disk according to the eighth embodiment.

FIG. 11 shows details of the optical disk 12. This optical disk 12 is aimed to the high density recording according to the minimization of the near field light 10 formed by the optical head 1. A polycarbonate substrate or the like is used as the plastic disk 120. The recording medium 121 is formed by stacking an Al reflective film (100 nm thick) 121a, an $SiO_2$ layer (100 nm thick) 121b, a GeSbTe recording layer (15 nm thick) 121c, and an SiN layer (50 nm thick) 121d on one side of this optical disk 12. In this embodiment, mark length is 0.05 $\mu$m, recording density is 130 Gbits/inch$^2$, and these correspond to the recording capacity of 210 GB in a 12-cm disk. Therefore, it is possible to realize high density that is 45 times as high as that of a conventional DVD.

Figure 12A:
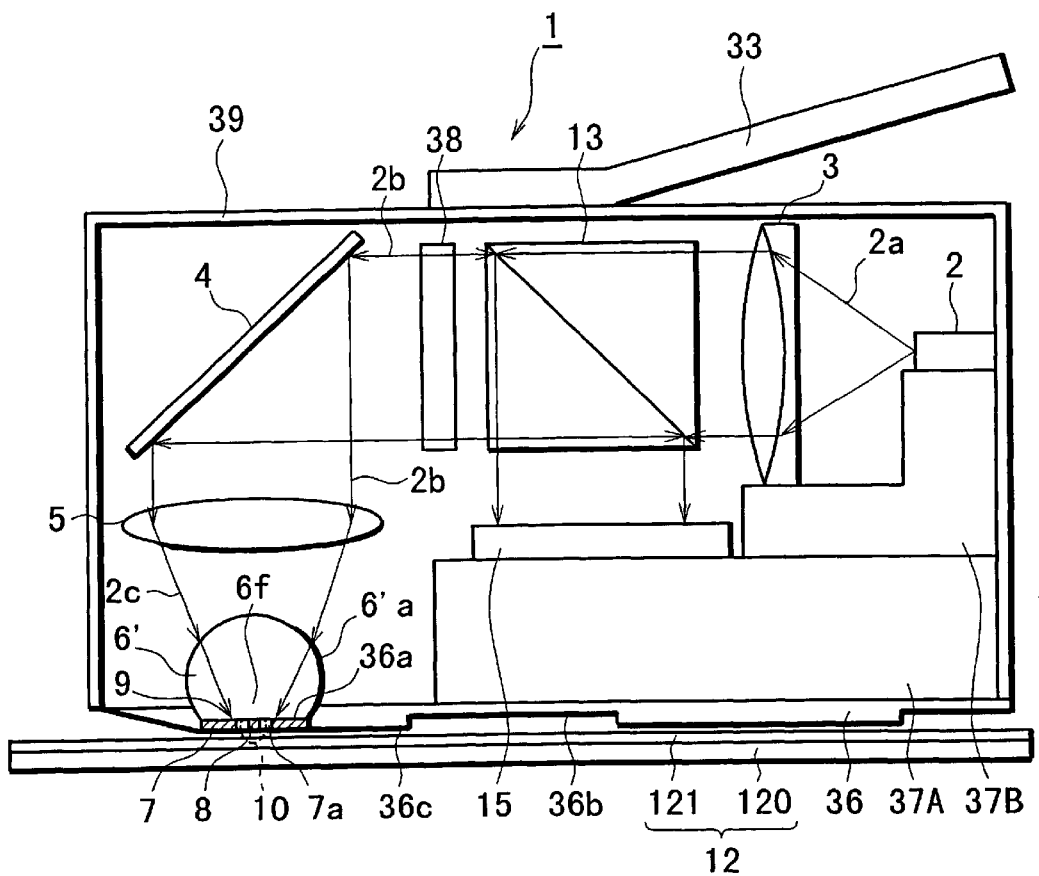
FIG. 12A is a vertical cross-sectional view showing an optical head according to the eighth embodiment.
Figure 12B:
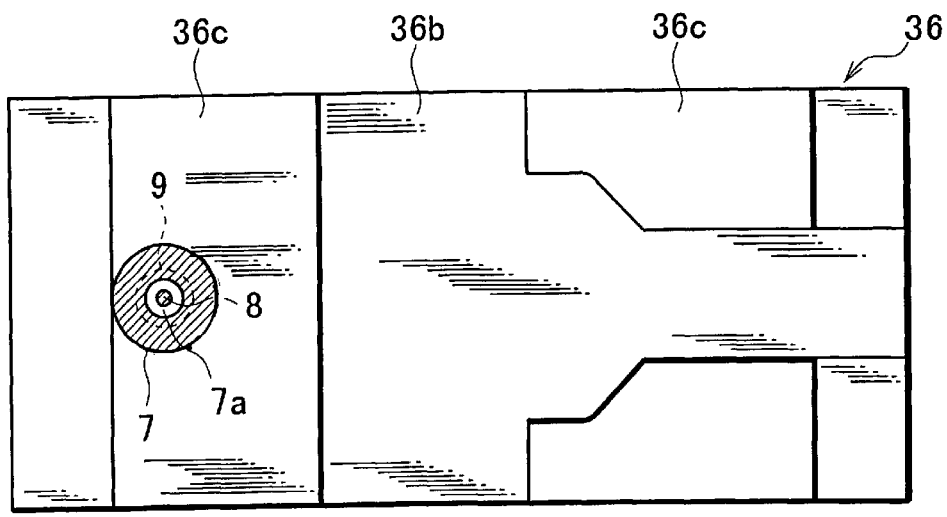
FIG. 12B is a schematic diagram showing its bottom surface.

FIGS. 12A and 12B show an optical head 1 according to the eighth embodiment of the present invention. The optical head 1 has a flying slider 36 flying over the optical disk 12. The components arranged on this flying slider 36 are: an edge emitting semiconductor laser 2 that is made of AlGaInP and emits a laser beam 2a with the wavelength of 630 nm; a collimator lens 3 shaping the laser beam 2a emitted from the semiconductor laser 2 into a parallel beam 2b; a seat 37A that is composed of a fused quartz plate and is attached on the flying slider 36; a holder 37B that is composed of a fused quartz plate and fixes the semiconductor laser 2 and collimator lens 3 on the seat 37A; a polarized beam splitter 13 which splits the parallel beam 2b and reflected light from the optical disk 12; a quarter wave plate 38 changing linearly polarized light of the parallel beam 2b to a circularly polarized light; a mirror 4 vertically reflects the parallel beam 2b; an objective lens 5 and an upper transparent condensing medium 6' that converge the parallel beam 2b reflected by the mirror 4; and a photo detector 15 which is mounted on the seat 37A and detects the reflected light from the optical disk 12 through the beam splitter 13. In addition, all the components recontained in a head case 39, and the head case 39 is fixed at an end of the suspension 33.

The upper transparent condensing medium 6' is made of, for example, dense flint glass with a refractive index n of 1.91, and has the size of 1 mm diameter and approximately 1.3 mm high. Furthermore, the upper transparent condensing medium 6', similarly to the transparent condensing medium 6 shown in FIG. 1, has the Super SIL structure, and the flying slider 36 is composed of a clear medium 6 having a refractive index nearly equal to that of the upper transparent condensing medium 6'. The light spot 9 is formed on the light-condensed surface 36a of the flying slider 36. Thus, the upper transparent condensing medium 6' and flying slider 36 act as a transparent condensing medium. Similarly to the first and second embodiments, the shade 7 having the aperture 7a, and the micro metal member 8 are provided on the light-condensed surface 36a of the flying slider 36.

The flying slider 36, as shown in FIG. 12B, has a groove 36b so that negative pressure occurs in a part except a periphery of the light spot 9 formed on the light-condensed surface 36a. A gap between the flying slider 36 and optical disk 12 is kept constantly as a flying height by the positive pressure in a convex part 36c of the flying slider 36, the negative pressure by the groove 36b, and elasticity of the suspension 33.

The optical head driving unit 34 records data as the difference of the reflectance caused by the phase change between crystalline and amorphous in the recording medium 121 corresponding to the modulated beam from the semiconductor laser 2 with the recording data. Furthermore, the system 34 reproduces data by detecting the difference of reflectance in the recording medium 121 with the photo detector 15 by continuously applying the beam from the semiconductor laser 2.

The signal processing unit 35 generates an error signal for tracking control and a data signal on the basis of the reflected light detected by the photo detector 15 from the optical disk 12, generates an error signal in high and low frequency range with a high-pass filter and a low-pass filter, and performs tracking control for the optical head driving unit 34 on the basis of these error signals. Here, the error signals for tracking are generated by a sample servo system (Optical disk technology, Radio Technology Co., Ltd., p.95). This sample servo system is a system of providing wobbled marks on a track intermittently, and generating error signals from variation of reflection intensity from them. In the case of the sample servo system, since a recording signal and tracking error signals are separated on time-sharing basis, separation of them is performed by a gate circuit in a reproduction circuit. In addition, since use of the sample servo system means use of a photo detector with one photo-detecting surface, a semiconductor laser having a self-coupling effect can be used at the same time as a photo detector. This system is preferable for combination with a so-called SCOOP system. Therefore, it is possible to perform SCOOP type photo detection by coating an antireflection film on output surface of the semiconductor laser 2, and constructing a resonator for the semiconductor laser 2 with the rear mirror of the semiconductor laser 2 and the light-condensed surface 6b of the transparent condensing medium 6, and the recording medium.

Next, the operation of the disk apparatus 100 according to the eighth embodiment will be described. The optical disk 12 rotates at predetermined speed by a motor not shown. The flying slider 36 levitates over the optical disk 12 by positive and negative pressure, generated by the rotation of the optical disk 12, and elasticity of the suspension 33. When the laser beam 2a is emitted from the semiconductor laser 2 by driving performed by the optical head driving unit 34, the laser beam 2a from the semiconductor laser 2 is shaped into the parallel beam 2b by the collimator lens 3. After that, the parallel beam 2b enters an incident surface 6'a of the upper transparent condensing medium 6' through a polarizing beam splitter 13 and the quarter wave plate 38. The parallel beam 2b is changed from linear polarized light to circularly polarized light by the quarter wave plate 38 when passing through the quarter wave plate 38. The parallel beam 2b that is the circularly polarized light is converged by the objective lens 5, and is refracted and condensed in the incident surface 6'a of the upper transparent condensing medium 6'. Furthermore, the parallel beam 2b is condensed on the light-condensed surface 36a of the flying slider 36. The small light spot 9 is formed on the light-condensed surface 36a of the flying slider 36. Part of light of the light spot 9 leaks out from the micro metal member 8 positioned under this light spot 9 as the near field light 10 to the outside of a lower surface 36c of the flying slider 36. Then, this near field light 10 propagates to the recording medium 121 of the optical disk 12, and recording and reproduction is performed. Thus, the recording medium 121 is heated lower than a melting point by irradiating the near field light 10, and recording is performed by causing a phase change from amorphous to crystalline. On the other hand, when the near field light 10 that is weaker than that at the time of recording irradiates the recording medium 121 of the optical disk 12, the near field light 10 is reflected with different reflectance according to the amorphous or the crystalline portion at the recording medium 121. The reflected light inversely traces along the path of the incident light, and is refracted in the incident surface 6'a of the upper transparent condensing medium 6', and reflected at the mirror 4. The reflected light is transformed to the linearly polarized light, whose polarization is different by 90° from the incident beam 2a, by the quarter wave plate 38. After that, the reflected light is reflected to the orthogonal direction by the polarizing beam splitter 13 to be entered to the photo detector 15, then the reproduction is performed. The signal processing unit 35 generates an error signal for tracking control and a data signal from the reflected light, which enters photo detector 15, from the optical disk 12, and performs tracking control for the optical head driving unit 34 from the error signal.

According to the disk apparatus 100 according to the above-described eighth embodiment, a maximum refractive angle in the incident surface 6'a of the upper transparent condensing medium 6' becomes 60°, the NA is 0.86. In consequence, the minute light spot 9 whose spot diameter $D_{1/2}$ is nearly 0.2 $\mu$m can be obtained and the near field light 10 around the shade 7, whose size is 50 nm, can enter the recording medium 121 of the optical disk 12, so it is possible to perform optical recording and reproduction at ultra high density (180 Gbits/inch$^2$).

In addition, by combining the sample servo system with, the recording signal and tracking error signal are separated in time-sharing. So the photo detector 15 is not needed a split type but a single photo detector, a 1 mm-square PIN photo diode for example. Because of no necessity of the split type detector, the detection system can be drastically simplified and lighter in weight.

Since the size of the optical head 1 is reduced to nearly 8 mm long, 4 mm wide and 6 mm high and recording and reproduction can be performed without an automatic focus control mechanism, it is possible to drastically reduce the weight of the optical head 1. Hence it is possible to miniaturize the optical head 1. The weight of the optical head 1 was nearly 0.6 g with including the weight of the moving coil 32b of the linear motor 32 and the like, the bandwidth of the tracking frequency was 50 kHz, and gain was 60 dB or more.

In addition, since eccentricity of the disc is decreased to 25 $\mu$m, it is possible to perform tracking fulfilling required accuracy of 5 nm at a rotation of 6000 rpm. Since an average transfer rate in this case is 60 Mbps, it becomes possible to perform recording and reproduction of a video signal at a UGA level.

It is possible to use various types of recording medium for an optical recording medium, such as a read-only disk having embossed pits, a recording and reproduction medium using magneto-optical or phase change material, and write-once type medium performing recording by forming embossed pits through optical absorption of dye and the like.

A linearly polarized laser beam can be used for the irradiation beam by using no quarter wave plate 38 and an unpolarized beam splitter instead of the polarized beam splitter 13.

In addition, although in the disk apparatus of this embodiment the optical head of the first embodiment is used, the present invention is not limited to this, but each of the optical heads of the third to seventh embodiments can be used. Furthermore, with the magneto-optical head of the seventh embodiment, a disk apparatus performing optical assist magnetic recording can be constructed by combining a magnetic recording medium such as an in-plane recording film or a vertical recording film such as a Co—Cr—Ta film, a magneto-optical recording film such as a TbDyFeCo/TeFeCo film, and the like.

Moreover, instead of the sample servo method, a wobbled track system, which generates an error signal by wobbling the track periodically and detecting a modulated reflection by synchronizing the wobbling frequency, can be used for the generation of an error signal for tracking control in the embodiment.

In addition, it is possible to use a three-spot method for the tracking of a playback-only disk as performed for CDs. The error signal is obtained by inserting a diffraction grating between the collimator lens 3 and polarized beam splitter 13, locating respective photo detecting elements, which detect a respective reflected light of the first order light from a disk, in both sides of a main beam detecting element, and generating the difference of the outputs of the photo detecting elements.

Furthermore, the optical head 1 in this embodiment can be used for recording to and reproducing from a write-once type optical disk (a disk where embossed pits are formed by optical absorption of dye).

Magneto-optical recording using a magneto-optical medium becomes possible by mounting a film coil in the periphery of the position where the light spot 9 is formed on the lower surface 36c of the flying slider 36. Nevertheless, at the time of reproduction, a signal is generated by detecting the rotation of an optical polarized surface with polarization analysis, it is necessary to detach the quarter wave plate 38, to change the polarized beam splitter 13 to an unpolarized splitter, and to locate an analyzer before the photo-detecting element.

In addition, although in this embodiment the edge emitting laser is used as a laser source, it is also possible to use a vertical cavity surface emitting laser (VCSEL). The maximum output of the surface emitting laser in a fundamental mode (TEM00) is nearly 3 mW, that is, one-tenth or less of that of the edge emitting laser. The diameter of a light spot in this embodiment is stopped to a fraction of that in a conventional disk apparatus. Since the optical density can be increased by one-digit or higher, even the surface emitting semiconductor laser can perform recording. Since the wavelength of the surface emitting semiconductor laser hardly fluctuates with temperature, it is possible to make the correction of chromatic aberration unnecessary.

Figure 13A:
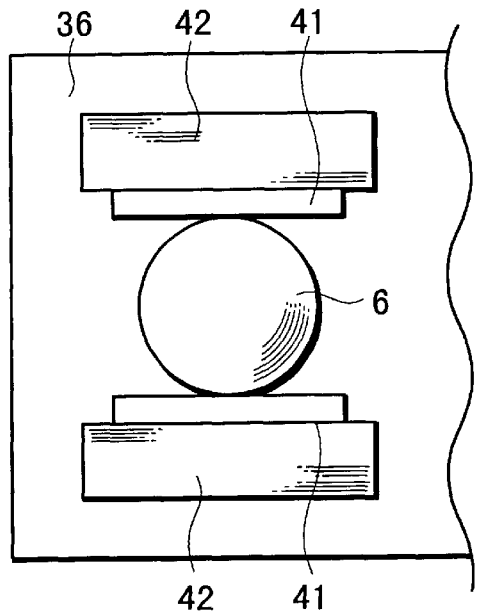
FIGS. 13A to 13C are schematic diagrams showing principal parts of an optical head of a disk apparatus according to a ninth embodiment of the present invention.
Figure 13B:
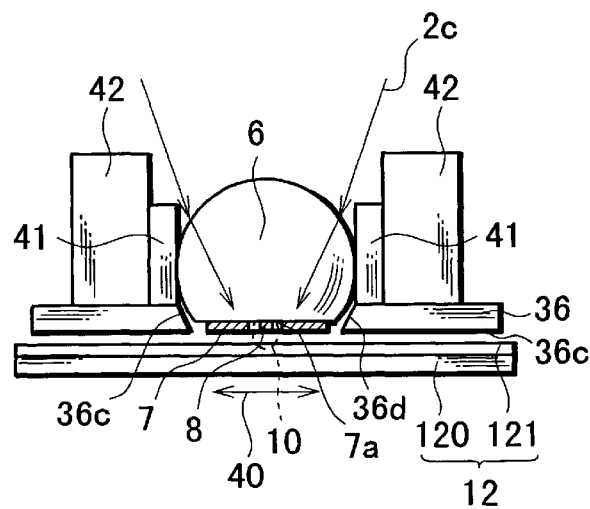
Figure 13C:
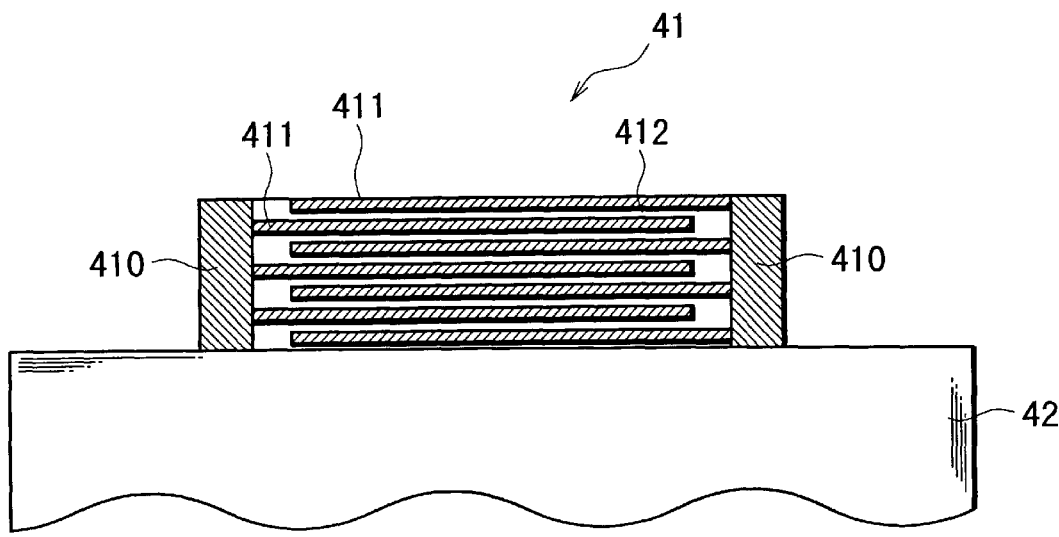

FIGS. 13A to 13C show a principal part of an optical head of a disk apparatus according to a ninth embodiment. In the optical disk 1 in this disk apparatus, a receptive opening 36d for a transparent condensing medium 6 is formed in a flying slider 36, and a pair of piezoelectric elements 41 making the transparent condensing medium 6 scan in the tracking direction 40 are provided in the flying slider 36 with a holder 42. In addition, other components are configured similarly to those in the disk apparatus 100 according to the eighth embodiment. The transparent condensing medium 6 has a light-condensed surface 6b. Although the light-condensed surface 6b can be protruded to or recessed from a lower surface 36b for adjusting the distance to an optical disk the light-condensed surface 6b is arranged so that the light-condensed surface 6b is almost flat with the lower surface 36b of the flying slider 36.

The pair of piezoelectric elements 41 and 41, as shown in FIG. 13C, is composed of plural electrode films 411, connected to electrodes 410 and 410 and a multi layer PZT film 412 (nearly 20 μm thick) formed between the electrode films 411. This piezoelectric element 41 is coated and formed on the holder 42, and this pair of piezoelectric elements 41 and 41 supports the transparent condensing medium 6 and scans the transparent condensing medium 6 in the direction vertical to a laser beam, that is, the tracking direction 40. In this manner, by making push-pull tracking operation by using the pair of piezoelectric elements 41 and 41, it becomes possible to avoid a hysteresis effect of a piezoelectric element and to perform tracking without delay. In addition, it is possible to move the transparent condensing medium 6 in the direction of an optical axis by using a piezoelectric element whose deformation direction is corresponding to the direction of the optical axis.

According to the disk apparatus of the above-described ninth embodiment, the weight of the transparent condensing medium 6 can be made to be 5 mg or less. Since a resonance frequency of a system supporting the transparent condensing medium 6 can be made to be 300 KHz or higher, the displacement can be 0.5 μm or larger by applying a voltage of 5 V between the electrodes 410 and 410.

In addition, the two-step control with the piezoelectric element 41 and linear motor 32, a frequency band width of 300 KHz can be obtained with the gain of 80 dB, and the tracking can be performed at the accuracy of 5 nm under high-speed rotation (3600 rpm). In the case of this embodiment, it is possible to increase the transfer rate six times higher than in the disk apparatus 100 in the first embodiment, that is, the rate becomes 360 Mbps.

If a multi beam optical head described later is used, it is possible to obtain the transfer rate of nearly 3 Gbps, that is, eight times faster than the conventional rates. It is possible to achieve average seek speed of less than 10 ms in a 12-cm disk. The access time at the rotation speed of 3600 rpm becomes 20 ms or shorter.

Figure 14:
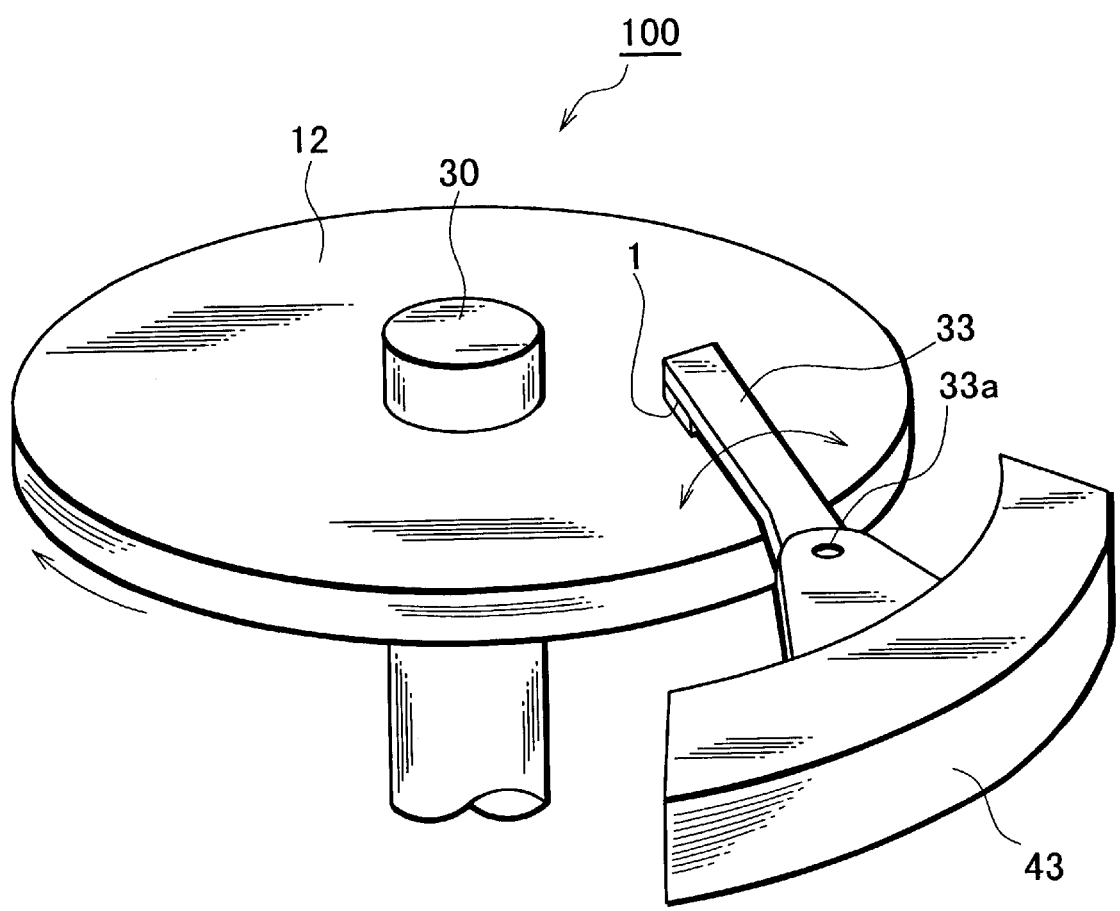
FIG. 14 is a schematic diagram showing a disk apparatus according to a tenth embodiment of the present invention.

FIG. 14 shows a disk apparatus according to a tenth embodiment of the present invention. In the tenth embodiment a rotary linear motor 43 used for a hard disk apparatus is used instead of the liner motor used in the eighth embodiment. The optical head 1 is connected to the rotary linear motor 43 with a suspension 33 supported by a pivot 33a. Since owing to such configuration the rotary linear motor 43 can be located outside the optical disk 12, the optical head 1 could be further thin, and hence it is possible to miniaturize the disk apparatus 100. In addition, the rotation speed of the optical disk 12 could be high (3600 rpm), it becomes possible to obtain the average data transfer rate of 360 Mbps or higher.

For the disk apparatus in this embodiment, each of optical heads in the first to seventh embodiments can also be used. Moreover, also in this embodiment, an unpolarized beam splitter without using the quarter wave plate 38 can be used instead of the polarized beam splitter 13, then the linearly polarized light can be used to irradiate the micro metal member 8.

Figure 15:
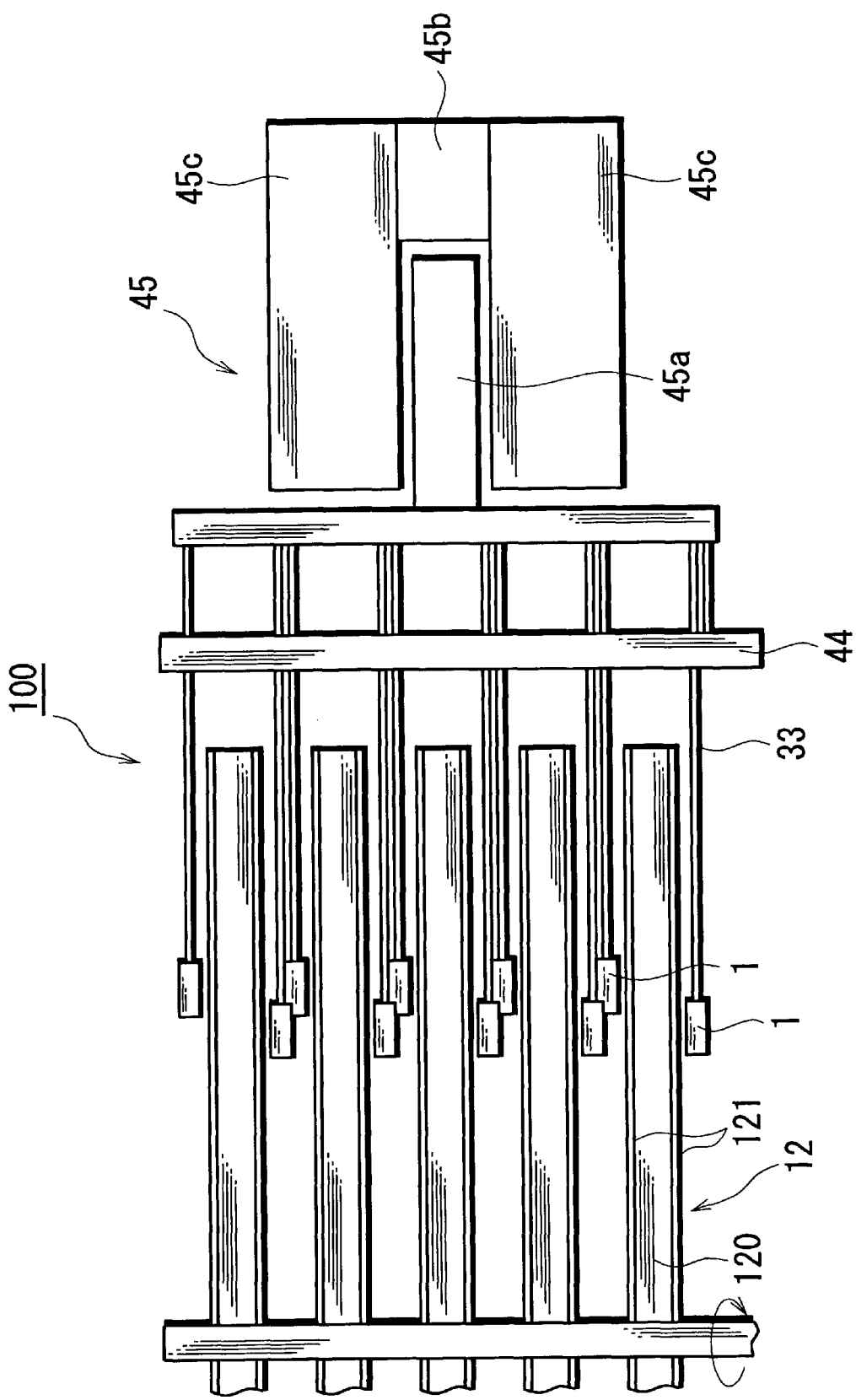
FIG. 15 is a schematic diagram showing a disk apparatus according to an eleventh embodiment of the present invention.

FIG. 15 shows a disk apparatus according to an eleventh embodiment of the present invention. This disk apparatus 100 is configured by applying the optical head 1, where the transparent condensing medium 6 shown in FIG. 6 is used, to a disk-stacked disk apparatus with five disks. This disk apparatus has five optical disks 12 each of which is composed of a plastic substrate 120 having recording medium 121 coated on the upper and lower surfaces thereof, ten pieces of the optical heads 1 flying over respective recording medium 121 of respective optical disks 12, a suspension 33 supporting the optical head 1 with a pivot 44, and a rotary linear motor 45 scanning the suspension 33. As the recording medium 121, either a phase change type medium or a magneto-optical medium also can be used. The rotary linear motor 45 includes a moving core 45a, to which the suspension 33 is connected, and electromagnets 45c and 45c connected to a yoke 45b and drives the moving core 45a. This optical head 1 has the structure similar to that shown in FIG. 7, and has a transparent condensing medium 6 having a paraboloid of revolution, and an AlGaInN laser (630 nm). The diameter of a light spot is 0.2 $\mu$m. Disk diameter is 12 cm, a track pitch and mark length is 0.07 $\mu$m and 0.05 $\mu$m respectively, single-sided capacity becomes 300 GB, and double-sided capacity becomes 600 GB.

The disk apparatus 100 according to the above-described eleventh embodiment, five optical disks 12 can be used, the capacity could be 3 TB. One of optical heads shown in FIGS. 7 and 8 can also be used as the optical head 1. The height of the optical head 1 could be 1 mm or lower, to decrease the height of a disk apparatus, and to increase capacity/volume.

Figure 16:
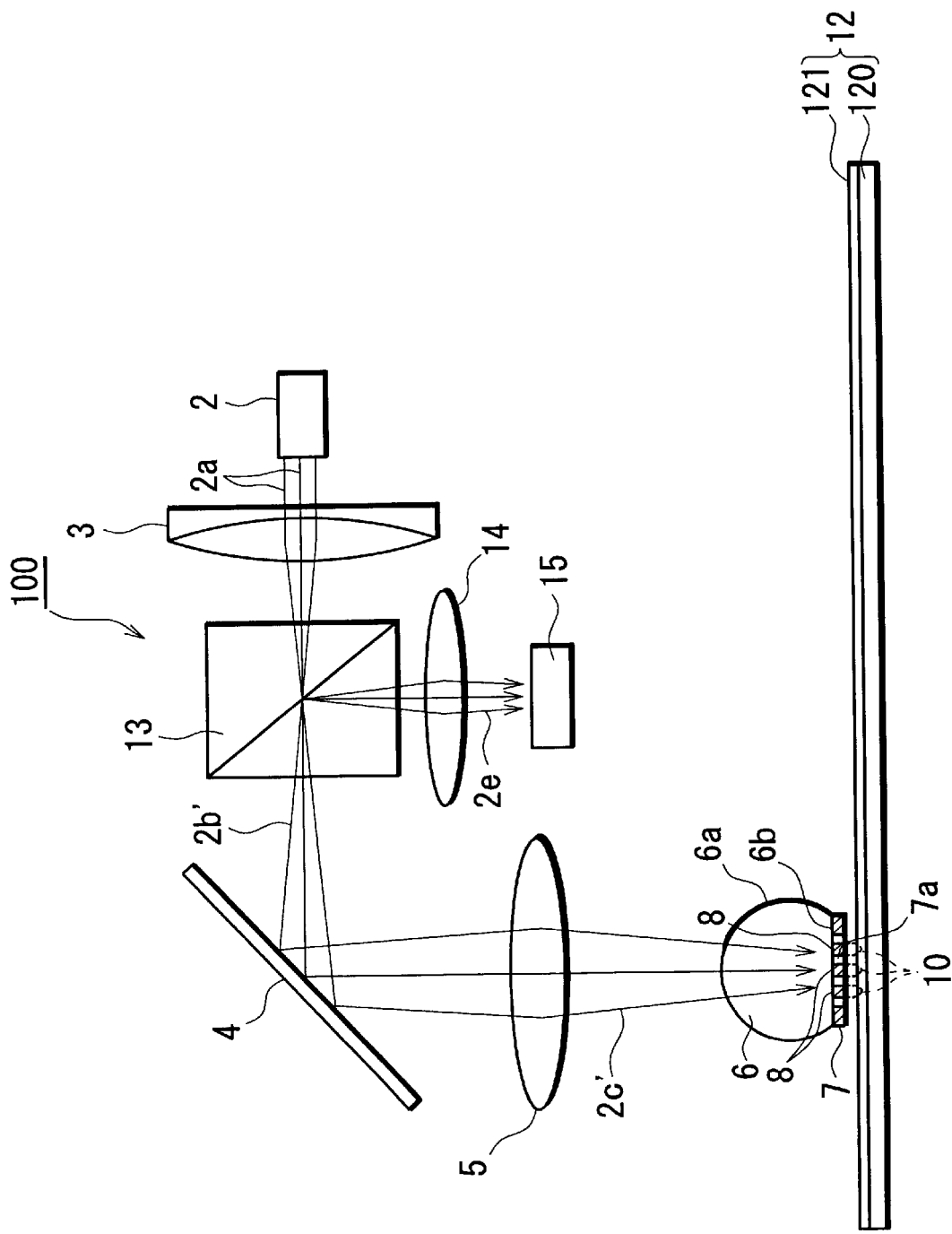
FIG. 16 is a schematic diagram showing a principal part of a disk apparatus according to a twelfth embodiment of the present invention.

FIG. 16 shows a principal part of a disk apparatus according to a twelfth embodiment of the present invention. The semiconductor laser 2 of this disk apparatus 100 includes plural (for example, eight) laser elements, which can be driven separately. The semiconductor laser 2 emits plural laser beams 2a from the plural laser elements, a collimator lens 3 collimates the laser beams 2a from the semiconductor laser 2 into predetermined incident beams 2b'. A mirror 4 reflects the incident beams 2b' in the predetermined direction. An objective lens 5 converges the incident beams 2b' reflected by the mirror 4. A transparent condensing medium 6 receives converged beams 2c' converged by the objective lens 5, forms plural light spots 9 on a light-condensed surface 6b. Like the medium shown in FIG. 1, a shade 7 is coated on the light-condensed surface 6b of the transparent condensing medium 6. An optical disk 12 has a recording medium 121 made of GeSbTe phase change material coated on one side of the disk-like plastic plate 120 and is rotated by a motor (not shown). A polarized beam splitter 13 splits an incident beams 2b' off from the light reflected by the optical disk 12. And an eight-part divided photo detector 15 receives the laser beams 2e split by the beam splitter 13 through a condenser lens 14.

Figure 17:
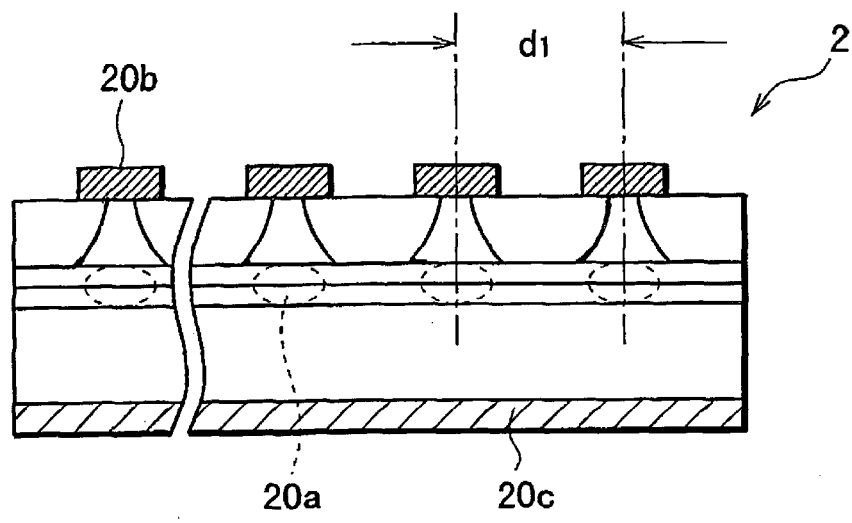
FIG. 17 is a cross-sectional view showing a semiconductor laser according to the twelfth embodiment.

FIG. 17 shows a semiconductor laser 2. The semiconductor laser 2 is an edge emitting semiconductor laser, and includes an active layer 20a, a p-type electrode 20b, and an n-type electrode 20c. The distance d1 of the p-type electrode 20b is 15 $\mu$m, and a distance of the laser beams 2a is made to be 15 $\mu$m.

Figure 18:
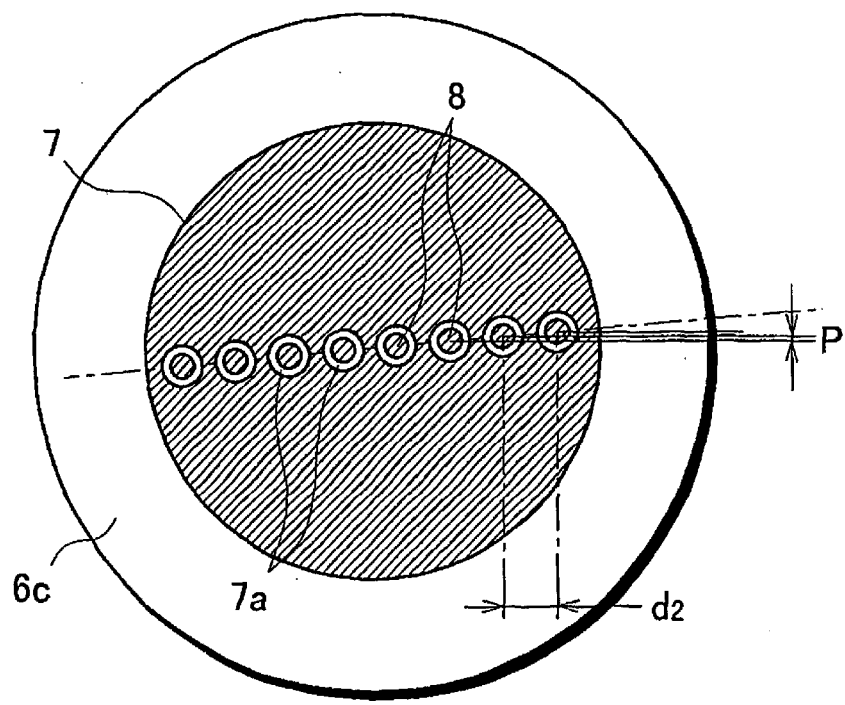
FIG. 18 is a schematic diagram showing a shade according to the twelfth embodiment.

FIG. 18 shows a shade 7 and micro metal members 8. The shade 7 has eight apertures 7a corresponding to the number of the laser beams 2a, and one micro metal member 8 is formed in a center of each aperture 7a. The NA of the collimator lens 3 is 0.16, the NA in the transparent condensing medium 6 is 0.8, and a distance d1 of the laser beams 2a is 15 $\mu$m. Therefore, a distance of light spots 9 on the light-condensed surface 6b, that is, a distance d2 of the micro metal bodies 8 in the apertures 7a is made to be 3 $\mu$m. The direction of an array axis of the micro metal bodies 8 is slightly inclined to tracks of the optical disk 12 so that each of the micro metal members 8 is positioned just above the corresponding track adjacent to each other. Thus, the micro metal member 8 are arranged so that the distance of the adjacent micro metal members 8 in the direction vertical to recording track is equal to a track pitch p (in this case, 0.07 $\mu$m). The tilting angle between the direction of the array axis of the micro metal members 8 and the tracks (not shown) is 23 milliradian, and this angle is formed by tilting the supporting member of the laser array and adjusting the array of the micro metal members 8 with photolithography for forming the micro metal members 8.

Next, the operation of the disk apparatus 100 according to the above-described twelfth embodiment will be described. By emitting the plural laser beams 2a from the semiconductor laser 2, they are shaped into the predetermined incident beams 2b' by the collimator lens 3, pass through the polarized beam splitter 13, reflected by the mirror 4, converged by the objective lens 5, refracted and condensed by the incident surface 6a of the transparent condensing medium 6, and are condensed on the light-condensed surface 6b. The plural light spots 9 are formed on the light-condensed surface 6b. The near field lights 10 leak out from the plural micro metal members 8 on the transparent condensing medium 6 under these plural light spots 9, and these near field lights 10 propagate to the recording medium 121 of the optical disk 12. Then, optical recording or reproduction is performed. The light reflected on the optical disk 12 inversely traces along the path of the incident light, and is refracted in the incident surface 6a of the transparent condensing medium 6 to be reflected by the mirror 4. After being split from the incident beams 2b' by the polarized beam splitter 13, the reflected light is condensed on the eight-part divided photo detector 15 by the condenser lens 14.

According to the disk apparatus 100 according to the above-described twelfth embodiment, it is possible to simultaneously perform recording and reproduction in eight recording tracks separately by eight spots of the near field light 10, which can be independently modulated, from the eight micro metal members 8. Therefore, it is possible to make the transfer rates of recording and reproduction be eight times the conventional rates.

In addition, the array length of the micro metal members 8 is nearly 20 $\mu$m, and the curvature of a track in the interval is 0.007 $\mu$m, that is approximately one-tenth of track width, so the tracking deviation caused by this can be neglected.

Furthermore, by irradiating the plural micro metal members 8 with a beam spot and using near field light emitted from the plural micro metal members 8, a tracking frequency band width can be reduced.

Since in the edge emitting semiconductor laser, as shown in FIG. 17, emitting points are formed along the stacking direction of the active layer 20a, the direction of the emitting beam array is changed by the direction of the semiconductor laser being installed, i.e., the direction of the active layer being made to be vertical or horizontal. Therefore, the direction of the emitting beam array can be arbitrarily selected.

In addition, even if the semiconductor laser has single emitting point, a beam shape can be deformed according to the direction of the active layer. Therefore, by changing the direction of the semiconductor laser being installed to the vertical or horizontal direction, the desired beam shape and polarized direction can be selected.

Furthermore, the number of the micro metal members 8 is not limited to eight, but it is possible to change the number depending on needs. The transparent condensing medium 6 can be selected form a media of other embodiments.

Figure 19A:
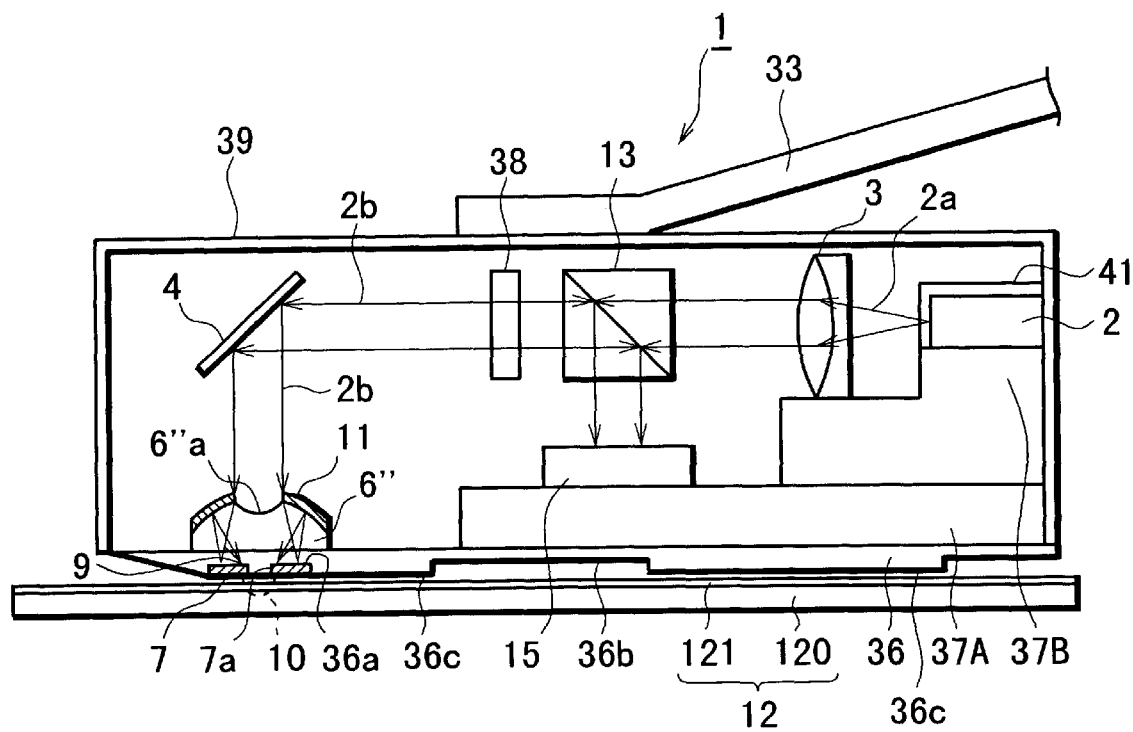
FIG. 19A is a vertical cross-sectional view of an optical head of a disk apparatus according to a thirteenth embodiment of the present invention.
Figure 19B:
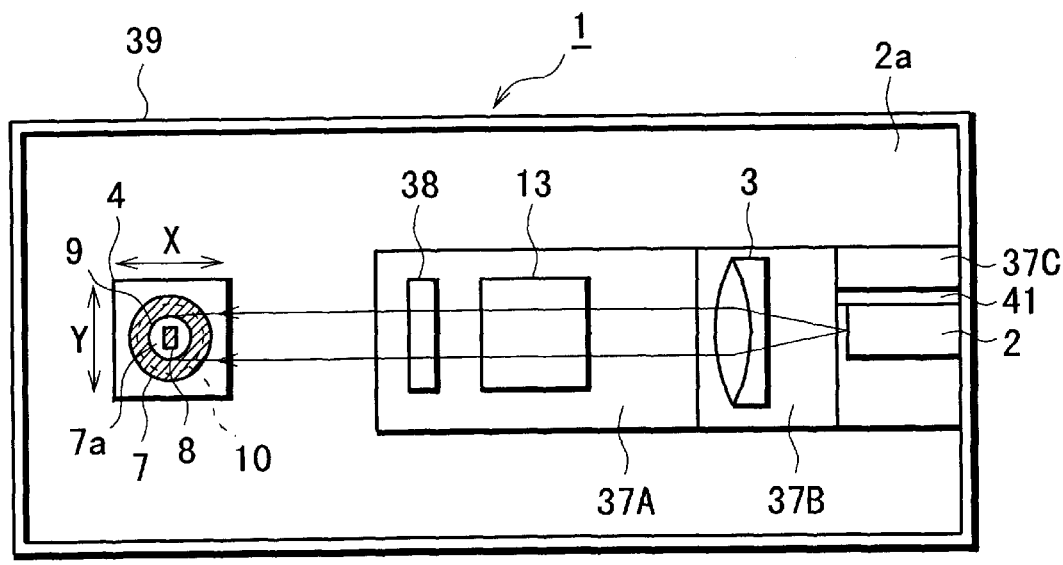
FIG. 19B is a horizontal cross-sectional view.
Figure 20A:
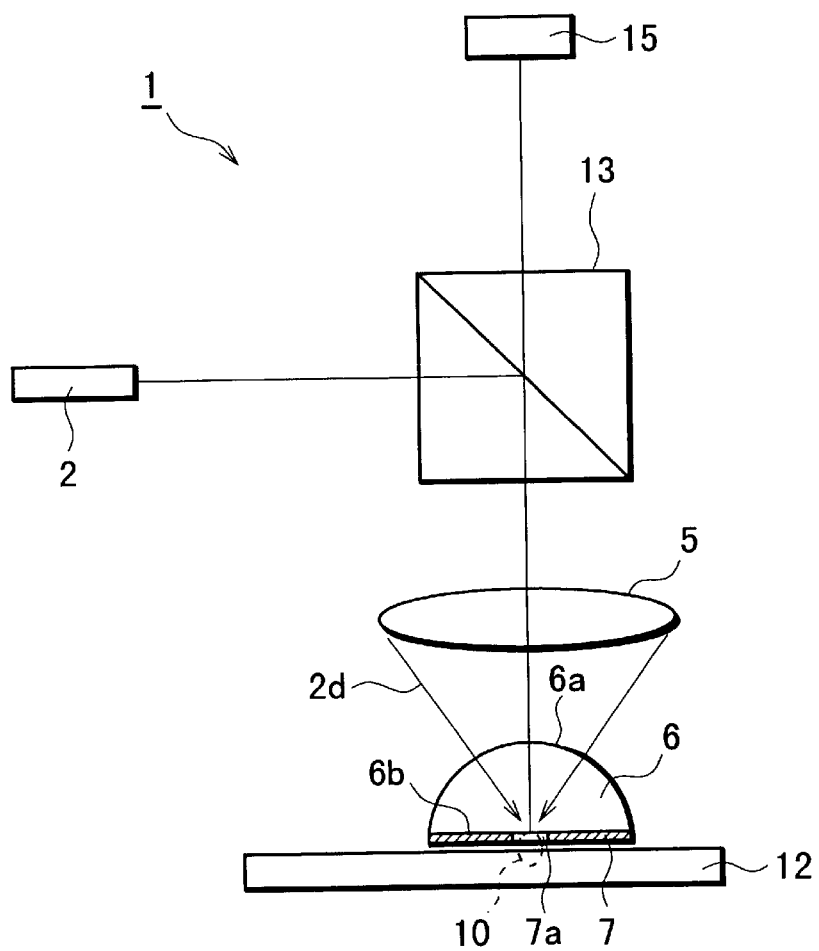
FIG. 20 is a schematic diagram showing a conventional disk apparatus.
Figure 20B:
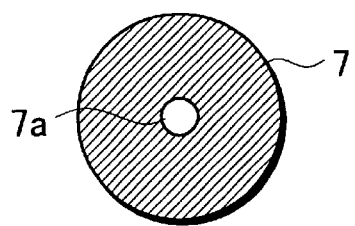
Figure 21:
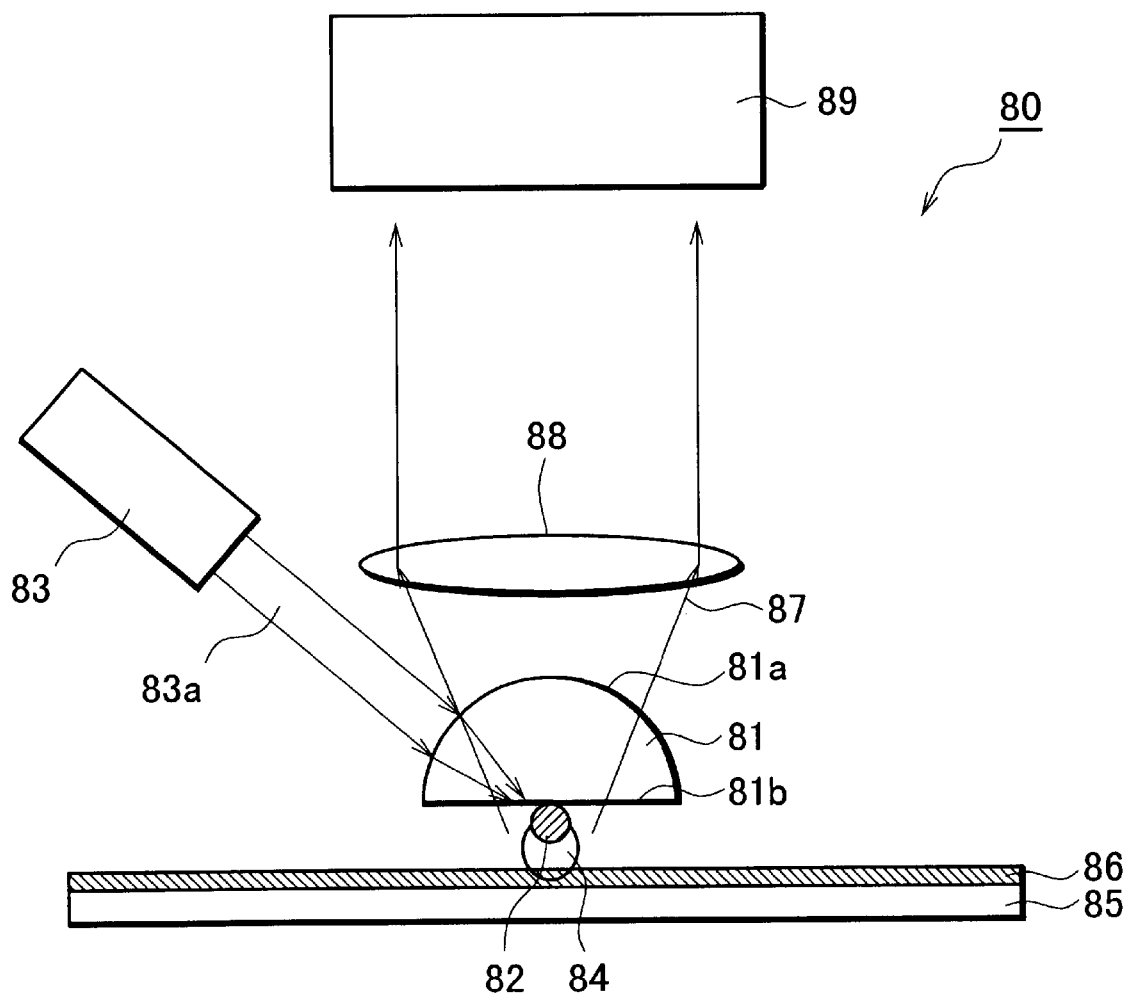
FIG. 21 is a schematic diagram showing another conventional disk apparatus.
Figure 22:
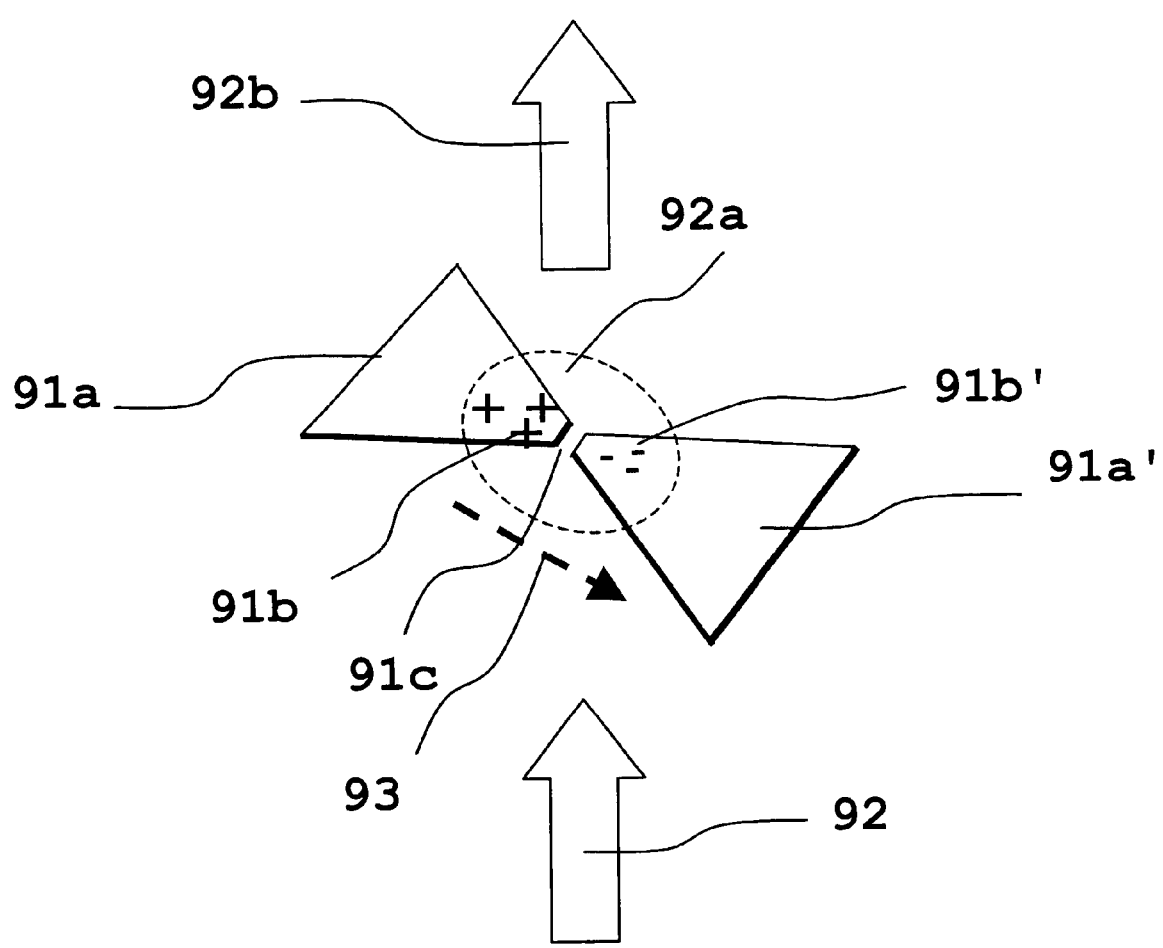
FIG. 22 is a schematic diagram showing a conventional optical recording method.

FIGS. 19A and 19B show an optical head of a disk apparatus according to a thirteenth embodiment of the present invention. This optical head 1 is configured by applying the optical head 1, shown in FIG. 8, to the disk apparatus 100 shown in FIG. 9. The optical head 1 has a flying slider 36 flying over an optical disk 12. Components on this flying slider 36 are an edge emitting semiconductor laser 2 that is made of, for example, AlGaInP and emits a laser beam 2a with the wavelength of 630 nm, a collimator lens 3 shaping the laser beam 2a emitted from the semiconductor laser 2 into a parallel beam 2b, a base 37A that is composed of a fused quartz plate and is attached on the flying slider 36, a base 37B that is composed of a fused quart plate and fixes the semiconductor laser 2 and collimator lens 3 on the base 37A, a base 37c supporting the semiconductor laser 2 through an piezoelectric element 41, a polarizing beam splitter 13 splitting the parallel beam 2b from the semiconductor laser 2 and reflected light from the optical disk 12, a quarter wave plate 38 transforming circularly polarized light of the parallel beam 2b to linearly polarized light, a mirror 4 vertically reflecting the parallel beam 2b, an upper transparent condensing medium 6" that converges the parallel beam 2b reflected by the mirror 4 and is shown in FIG. 8, a reflecting layer 11 coated on a reflecting surface 6e of the upper transparent condensing medium 6", and a photo detector 15 that is attached on the base 37A and receives the reflected light from the optical disk 12 through the beam splitter 13. All the components are contained in a head case 39, and the head case 39 is fixed at an end of the suspension 33. On a lower surface 36a of the flying slider 36, similarly to the configuration shown in FIG. 8, a shade 7 having an aperture 7a, and a micro metal member 8 are coated and formed.

According to the disk apparatus 100 according to the above-described thirteenth embodiment, near field light leaking out to the outside from the light spot 9 formed on the lower surface 36a of the flying slider 36 is stopped with the micro aperture 7a. Therefore, similarly to the disk apparatus 100 in the eighth embodiment, it is possible not only to perform optical recording and reproduction at ultra high density, but also to miniaturize the height of the optical head 1.

In addition, this optical head 1 can be applied to other disk apparatuses 100 shown in other embodiments.

An optical head of the present invention can be a so-called separated type optical head, the separated type optical head having such configuration that heavy parts such as a laser and a detector are placed in a fixed part and only lightweight components such as an objective lens and a folding mirror are placed on a moving part. As described above, in the optical head of the present invention, the high accuracy of the alignment is required between a light spot formed on a transparent condensing medium and a micro aperture, such as 0.1 µm or less. Because of vertical motion of the optical disk, motion of the moving part, deformation caused by a temperature change, and the like, it may be difficult for a separated type optical head to be accurately constructed the moving part and the fixed part to the level of not-separated type. Therefore, it is preferable to install at least a light-emitting element and the transparent condensing medium in a body. It becomes possible to prevent position shift of the light spot from the micro metal member 8 because of variation and distortion. A apparatus reading out the information recorded in an optical disk is not limited to the apparatus that detects reflected light as described in embodiments, but the present invention can be applied to a apparatus reading magnetism like a conventional GMR (Giant Magneto-resistive) sensor.

In the above-described embodiments, optical functions of a collimator lens, a reflection mirror, an objective lens, and an upper transparent condensing medium are functioned with one optical element. But, for an optical function, plural optical element can be combined. A shading film is required to be constructed so that at least a light spot is formed by condensing light on a surface of the transparent condensing medium and a micro aperture is positioned at the position.

It is not always necessary that a transparent condensing medium is consisted of one element, but also plural members can be connected each other to form the transparent condensing medium. For example, in order to make a surface of a side having a light-condensing function have functions of a flying slider, high-manufacturing accuracy is required in each side. Therefore, parts may be separately produced and joined at flat surfaces of them. The convex part positioned in an aperture part may serve as the transparent condensing medium of the present invention by adhering a transparent material having transparency nearly equal to that of the transparent condensing medium to the aperture part.

If a film having a refractive index that is about a square root of that of a transparent condensing medium is provided to the part where propagation light passes, the film may work as an antireflection film. For example, dense flint glass has a refractive index of nearly 2, and hence it is good enough to coat a film with a refractive index of nearly 1.4 such as an $SiO_2$ film.

As described above, according to the present invention, minute and high-efficiency near field light or propagation light is obtained by forming a minute light spot through condensing a laser beam on a light-condensed surface of a transparent condensing medium, arranging a shade having a micro aperture at the minute light spot, and arranging a micro metal member in the center of a micro aperture. Therefore, it is possible to realize high optical efficiency, a high-density recording, and high-speed recording and reproduction. In addition, it becomes possible to use small and lightweight light source and photo detector because of the increase of optical efficiency, an optical head can be minimized and a data transfer rate can be improved. Since part of a laser beam condensed outside an aperture is shielded by a shade, the part of a laser beam can be cut and not entered into a recording medium. Therefore, it is possible to prevent erroneous record or erroneous reproduction caused by such unexpected light.

What is claimed is:

1. An optical head, comprising:
   a transparent condensing medium which has a condensed surface and condenses the laser beam to form a beam spot on the condensed surface;
   a shade provided on the transparent condensing medium and having an aperture at a position where the beam spot is formed, the area of the aperture being smaller than the size of the beam spot; and
   a micro metal member at least part of which is positioned in the aperture.

2. The optical head according to claim 1, wherein the shape of the aperture is round or rectangular.

3. The optical head according to claim 1, wherein the shape of the micro metal member is round or rectangular.

4. The optical head according to claim 1, wherein the micro metal member is thinner than the thickness of the shade.

5. The optical head according to claim 1, wherein the shade has an tilted surface, in an edge of the aperture, which reflects the laser beam forming the light spot toward the aperture.

6. The optical head according to claim 1, wherein the transparent condensing medium has a convex part in a periphery of the micro metal member, and the convex part has an tilted surface that reflects toward the aperture the laser beam forming the light spot.

7. The optical head according to claim 1, wherein bottom surfaces of the shade and the micro metal member are flat with a surrounding surface of the transparent condensing medium.

8. The optical head according to claim 1, wherein the micro metal member is protruded from the light-condensed surface of the transparent condensing medium.

9. The optical head according to claim 1, wherein the optical head comprises a plurality of the micro metal members, and at least a pair of the micro metal members face each other with a gap positioned in the aperture therebetween.

10. The optical head according to claim 1, wherein the shade is made of metal and the micro metal member is connected to the shade.

11. An optical head, comprising:
   a transparent condensing medium which has a condensed surface and condenses the laser beam to form a beam spot on the condensed surface;
   a shade provided on the transparent condensing medium and having an aperture at a position where the beam spot is formed, the area of the aperture being smaller than the size of the beam spot; and
   a micro metal member at least a part of which is positioned in the aperture, wherein the metal shade and the micro metal member have the thickness of one-half or larger of a wavelength of the laser beam in the transparent condensing medium.

12. The optical head according to claim 11, wherein the transparent condensing medium surrounds a periphery of the micro metal member, and provides a convex part positioned in the aperture.

13. The optical head according to claim 11, wherein the metal shade has an tilted surface in an edge of the aperture, and the tilted surface reflects the laser beam forming the light spot toward the micro metal member.

14. The optical head according to claim 11, wherein the micro metal member has an tilted surface in its periphery, and the tilted surface reflects the laser beam forming the light spot toward the aperture.

15. The optical head according to claim 11, wherein the metal shade and the micro metal member constitute one of mirrors of an optical resonator of a laser emitting the laser beam forming the light spot.

16. A magneto-optical head comprising:
   a transparent condensing medium which has a condensed surface and condenses the laser beam to form a beam spot on the condensed surface;
   a shade provided on the transparent condensing medium and having an aperture at a position where the beam spot is formed, the area of the aperture being smaller than the size of the beam spot; and
   a micro metal member at least a part of which is positioned in the aperture; and
   a magneto-resistive sensor having a detecting part on a plane being flat with a bottom surface of the micro metal member.

17. The magneto-optical head according to claim 16, wherein the shade comprises a metal film,
   the shade and the micro metal member have the thickness of one-half or larger of a wavelength of the laser beam in the transparent condensing medium, and
   the micro metal member has the size lager than the light spot.

18. A disk apparatus comprising:
   a disk having a recording medium formed on its surface;
   a laser emitting a laser beam;
   an optical system having a transparent condensing medium which has a condensed surface and condenses the laser beam to form a beam spot on the condensed surface;
   a shade provided on the transparent condensing medium and having an aperture at a position where the beam spot is formed, the area of the aperture being smaller than the size of the beam spot;
   a micro metal member at least part of which is positioned in the aperture; and
   a shifting mechanism that shifts a light emitted from the aperture relative to the recording medium.

19. A disk apparatus, comprising:
   a disk having a recording medium formed on its surface;
   a laser emitting a laser beam;
      an optical system having a transparent condensing medium which has a condensed surface and condenses the laser beam to form a beam spot on the condensed surface;
   a shade provided on the transparent condensing medium and having an aperture at a position where the beam spot is formed, the area of the aperture being smaller than the size of the beam spot; and
   a micro metal member at least part of which is positioned in the aperture; and
   a shifting mechanism that shifts a light emitted from the aperture relative to the recording medium,
   wherein the metal shade and the micro metal member have the thickness of one-half or larger of a wavelength of the laser beam in the transparent condensing medium.

20. The disk apparatus according to claim 19,
   wherein the micro metal member has a narrow shape such as rectangular or elliptical, and
   the shifting mechanism performs tracking of the emitting-light from the aperture to a direction which is orthogonal to the major axis of the micro metal member.

21. The disk apparatus according to claim 19,
   wherein the transparent condensing medium is scanned in a direction orthogonal to a track by piezoelectric elements provided in both sides of the transparent condensing medium for tracking the emitting-light from the aperture.

22. A manufacturing method of an optical head, comprising the steps of:
   preparing a transparent condensing medium having a light-condensed surface where a light spot is formed by an incident laser beam;
   covering with photoresist a doughnut-shaped area having a size smaller than that of the light spot in a bottom surface of the transparent condensing medium;
   forming a concave part whose bottom surface is the light-condensed surface by removing an area, where the photoresist is not present, on the bottom surface of the transparent condensing medium in a predetermined depth which is equal to or smaller than a wavelength of the laser beam by etching; and
   forming a metal body having the doughnut-shaped aperture by depositing a metal material in the concave part.

23. The manufacturing method of an optical head according to claim 22, further comprising the step of forming a micro metal member by depositing a metal material in a central part of the aperture of the metal body by a focused ion beam method.

* * * * *